United States Patent
Seko

(10) Patent No.: US 7,782,492 B2
(45) Date of Patent: Aug. 24, 2010

(54) IMAGE DATA CONVERTER, PRINTER, METHOD OF CONVERTING IMAGE DATA, METHOD OF PRINTING IMAGE, AND METHOD OF PREPARING COLOR CONVERSION TABLE

(75) Inventor: Masayuki Seko, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 983 days.

(21) Appl. No.: 11/505,542

(22) Filed: Aug. 16, 2006

(65) Prior Publication Data

US 2007/0041028 A1 Feb. 22, 2007

(30) Foreign Application Priority Data

Aug. 17, 2005 (JP) ............................ P2005-236333

(51) Int. Cl.
*H04N 1/40* (2006.01)
(52) U.S. Cl. ........................................ 358/2.1; 358/504
(58) Field of Classification Search ................. 358/1.9, 358/2.1, 500, 504, 518, 523, 527; 382/162, 382/166–167
See application file for complete search history.

(56) References Cited

U.S. PATENT DOCUMENTS

| | | | | |
|---|---|---|---|---|
| 6,282,313 | B1 * | 8/2001 | McCarthy et al. | 382/162 |
| 6,388,674 | B1 * | 5/2002 | Ito et al. | 345/590 |
| 7,024,055 | B2 * | 4/2006 | Newman | 382/305 |
| 7,035,460 | B2 * | 4/2006 | Gallagher et al. | 382/167 |
| 7,173,736 | B2 | 2/2007 | Yamada | |
| 7,605,945 | B2 | 10/2009 | Kondo | |

2003/0174893 A1 * 9/2003 Sun et al. ................... 382/232

FOREIGN PATENT DOCUMENTS

| | | |
|---|---|---|
| JP | 2002-359748 | 12/2002 |
| JP | 2003-274202 | 9/2003 |
| JP | 2004-120217 | 4/2004 |
| JP | 2005-295047 | 10/2005 |

OTHER PUBLICATIONS

Abstract of Japanese Patent Publication No. 2002-359748, Pub. Date: Dec. 13, 2002, Patent Abstracts of Japan.
Abstract of Japanese Patent Publication No. 2003-274202, Pub. Date: Sep. 26, 2003, Patent Abstracts of Japan.
Abstract of Japanese Patent Publication No. 2004-120217, Pub. Date: Apr. 15, 2004, Patent Abstracts of Japan.
Abstract of Japanese Patent Publication No. 2005-295047, Pub. Date Oct. 20, 2005, Patent Abstracts of Japan.

* cited by examiner

*Primary Examiner*—Thomas D Lee
*Assistant Examiner*—Stephen M Brinich
(74) *Attorney, Agent, or Firm*—Martine, Penilla & Gencarella, LLP

(57) ABSTRACT

It is disclosed a method of generating mapping data for converting first image data adapted to be reproduced by a first imaging device having a first gamut to second image data adapted to be reproduced by a second imaging device having a second gamut which is different from the first gamut. A third gamut is determined so as to include the first gamut and the second gamut. The first gamut is extended to the third gamut to obtain first mapping relationships. The third gamut is compressed to obtain second mapping relationships. It is generated mapping data associating first colors included in the first gamut with second colors included in the second gamut by way of the first mapping relationships and the second mapping relationships.

3 Claims, 23 Drawing Sheets

FIG. 9

| | | | | | | | | | | | | | | | | |
|---|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 |
| 123 | 33 | 127 | 181 | 83 | 155 | 105 | 140 | 30 | 150 | 119 | 182 | 40 | 89 | 220 | 163 | 44 |
| 219 | 91 | 237 | 22 | 121 | 198 | 61 | 188 | 111 | 215 | 3 | 98 | 201 | 140 | 10 | 95 |
| 11 | 195 | 53 | 136 | 227 | 37 | 247 | 12 | 233 | 52 | 192 | 135 | 32 | 246 | 113 | 194 |
| 99 | 144 | 107 | 184 | 68 | 172 | 97 | 151 | 77 | 173 | 84 | 237 | 123 | 61 | 167 | 46 |
| 225 | 40 | 251 | 6 | 217 | 116 | 28 | 196 | 125 | 35 | 207 | 17 | 153 | 203 | 24 |
| 87 | 169 | 78 | 162 | 59 | 146 | 211 | 64 | 254 | 142 | 72 | 178 | 87 | 118 | 228 |
| 190 | 15 | 202 | 111 | 238 | 19 | 93 | 169 | 8 | 110 | 221 | 49 | 249 | 2 | 144 |
| 74 | 246 | 134 | 43 | 174 | 128 | 230 | 50 | 216 | 154 | 26 | 168 | 79 | 184 |
| 176 | 30 | 98 | 219 | 86 | 34 | 139 | 195 | 101 | 56 | 241 | 127 | 213 | 37 |
| 69 | 148 | 196 | 2 | 159 | 247 | 89 | 11 | 136 | 185 | 92 | 14 | 108 |
| 187 | 41 | 126 | 226 | 106 | 57 | 190 | 115 | 235 | 36 | 208 | 121 | 229 |
| 81 | 214 | 92 | 53 | 145 | 204 | 27 | 166 | 74 | 157 | 82 | 165 | 31 |
| 232 | 21 | 170 | 240 | 13 | 132 | 252 | 51 | 222 | 4 | 245 | 48 |
| 130 | 155 | 55 | 115 | 183 | 78 | 122 | 196 | 102 | 180 | 65 | 173 |
| 72 | 252 | 100 | 211 | 45 | 231 | 20 | 148 | 39 | 133 | 205 |
| 202 | 32 | 179 | 5 | 163 | 95 | 191 | 86 | 239 | 111 | 29 |
| 104 | 143 | 58 | 243 | 70 | 218 | 63 | 161 | 9 | 209 |
| 64 | 236 | 129 | 110 | 151 | 25 | 199 | 49 | 172 | 68 |
| 171 | 17 | 208 | 38 | 225 | 131 | 99 | 254 | 113 |
| 80 | 191 | 87 | 174 | 76 | 189 | 13 | 143 |
| 247 | 35 | 152 | 2 | 248 | 55 |
| 140 | 108 | 197 | 127 | 96 |
| 13 | 215 | 46 | 229 |
| 164 | 90 | 180 |
| 52 | 253 |
| 205 |

→ 64 PIXELS (horizontal)
↓ 64 PIXELS (vertical)

IMAGE DATA CONVERTER, PRINTER, METHOD OF CONVERTING IMAGE DATA, METHOD OF PRINTING IMAGE, AND METHOD OF PREPARING COLOR CONVERSION TABLE

BACKGROUND OF THE INVENTION

The present invention relates to a technology for converting color image data, and in detail it pertains to a technology for converting color image data that can be reproduced without any sense of incongruity when reproducing color image data, which have been prepared for a first imaging device, by a second imaging device.

Although there are variable types of apparatuses such as a color display, a color printer, etc., as an imaging device capable of reproducing color images, these imaging devices are different from each other in view of the basic principle and detailed rules for reproducing colors, wherein the ranges of colors (referred as gamuts or color gamuts) which can be reproduced are different from each other in respective apparatuses. For example, a color display reproduces colors based on the principle of a so-called additive color mixture, a color printer reproduces colors based on the principle of a subtractive color mixture. To correspond to differences in such principles, a difference arises in the range of colors that can be reproduced. In addition, even in cases of color displays or color printers, it is normal that these have different ranges of colors in respective apparatuses since, if the types thereof differ, the specifications thereof and/or components are accordingly different from each other.

Thus, since the gamuts of imaging devices differ from each other among the types thereof, it is necessary to execute data conversion when reproducing, by a different imaging device, color image data prepared by a specified imaging device or color image data prepared under the assumption that the data are reproduced by a specified apparatus. For example, where color image data displayed on a color display are supplied to a color printer and the image is printed, it is necessary that, with respect to a gamut which cannot be reproduced by a color printer although the same can be reproduced by the color display, the colors in the gamut are changed to colors which can be reproduced by the color printer and are reproduced. Further, in order to print favorable color images by making the gamut of the color printer as wide as possible and utilizing the same, data conversion is required so that a part of the gamut of the color display is extended to the gamut of the color printer. Such data conversion may be called "mapping."

Such data conversion (mapping) is executed with reference to a matching relationship of color image data with the matching relationship thereof stored between different imaging devices. For example, where a color image displayed in a color display is printed by a color printer, the matching relationship between the image data displayed in the color display and the image data supplied to the color printer are predetermined, and after color image data used to be displayed on the display are converted in compliance with such a matching relationship, the color image data are supplied to the color printer, thereby printing the color image. And, in order to obtain a favorable color image, it is important to predetermine an adequate matching relationship so that, while absorbing differences in gamuts between different imaging devices, the gamut of an imaging device at the reproducing side can be used as widely as possible. Various methods have been proposed as a method for prescribing such a matching relationship (For example, in Japanese Patent Publication No. 2002-359748A).

However, it is not necessarily easy that a matching relationship is established so that, while absorbing differences in gamuts between different imaging devices, the gamut of an imaging device at the reproducing side is used as widely as possible. In fact, such a problem exists that there are many cases where it is difficult to establish an adequate matching relationship. That is, it is common that the gamut deviates between different imaging devices, and there are many areas in which the gamuts overlap each other. In such areas, the same colors can be reproduced. And, in view of securing the same color appearance not depending on a difference in displaying imaging devices, it is highly recommended that, in such areas where the gamuts overlap, the color image data be converted (mapped) so that the original colors can be retained as accurately as possible. That is, data conversion by which areas that cannot be reproduced due to deviation in the gamuts are compressed within a specified gamut, and to the contrary, areas that are not utilized are extended in the range of the gamut is requested to be executed in only a narrow area where the gamuts overlap each other. As a result, another problem arises, by which continuity of the colors becomes unnatural and the image brings about a sense of incongruity.

SUMMARY OF THE INVENTION

It is therefore an object of the invention to provide a technology capable of favorably displaying color images in any imaging devices by establishing an adequate matching relationship so that the gamut of an imaging device at the reproducing side can be used as widely as possible while absorbing differences in the gamuts between different imaging devices.

It is also an object of the invention to provide a technology capable of easily and simply establishing a matching relationship by which differences in gamuts can be adequately absorbed between different imaging devices.

In order to achieve the above objects, according to the invention, there is provided a method of generating mapping data for converting first image data adapted to be reproduced by a first imaging device having a first gamut to second image data adapted to be reproduced by a second imaging device having a second gamut which is different from the first gamut, comprising:

determining a third gamut so as to include the first gamut and the second gamut;

extending the first gamut to the third gamut to obtain first mapping relationships;

compressing the third gamut to obtain second mapping relationships; and generating the mapping data associating first colors included in the first gamut with second colors included in the second gamut by way of the first mapping relationships and the second mapping relationships.

With this configuration, it is possible to adequately convert color image data while absorbing differences in gamuts between the first imaging device and the second imaging device while maintaining continuity in lightness and color saturation of colors.

The third gamut may be determined so as to have a line connecting a first point at which a color saturation becomes maximum in the first gamut and a second point at which the color saturation becomes maximum in the second gamut.

In this case, it is possible to easily and simply generate the third gamut containing the first gamut and the second gamut.

The method may further comprises:

a) preparing a plurality of gamuts in advance;

b) selecting a smaller one of the gamuts;

c) comparing the smaller one of the gamuts with the first gamut and the second gamut;

d) determining the smaller one of the gamuts as the third gamut when the smaller one of the gamuts includes the first gamut and the second gamut;

e) selecting a larger one of the gamuts when the smaller one of the gamuts does not include any one of the first gamut and the second gamut; and f) repeating the steps b) through e) until selected one of the gamuts includes the first gamut and the second gamut.

In this case, an unnecessarily large gamut is not selected as the third gamut.

The extending and the compressing may be performed except a region which is a part of an area in which the first gamut and the second gamut are overlapped each other.

In this case, in portions where the same color can be reproduced even in the first gamut and the second gamut (that is, the area in which two gamuts overlap each other), it is favorable that the first gamut is converted to the second gamut so that the color is not changed as much as possible before and after the conversion.

According to the invention, there is also provided an image data converter, operable to convert first image data adapted to be reproduced by a first imaging device having a first gamut to second image data adapted to be reproduced by a second imaging device having a second gamut which is different from the first gamut, comprising:

a storage, operable to store the mapping data obtained by the above method; and a converter, operable to convert the first image data to the second image data with the mapping data stored in the storage.

According to the invention, there is also provided a printer, comprising:

the above image converter; and a printing mechanism, operable to print an image on a printing medium based on the second image data.

BRIEF DESCRIPTION OF THE DRAWINGS

The above objects and advantages of the present invention will become more apparent by describing in detail preferred exemplary embodiments thereof with reference to the accompanying drawings, wherein:

FIG. 9 is a diagram showing a part of a dither matrix used in halftoning executed in the printer;

DETAILED DESCRIPTION OF THE EMBODIMENTS

Embodiments of the invention will be described below in detail with reference to the accompanying drawings.

Figure 1:
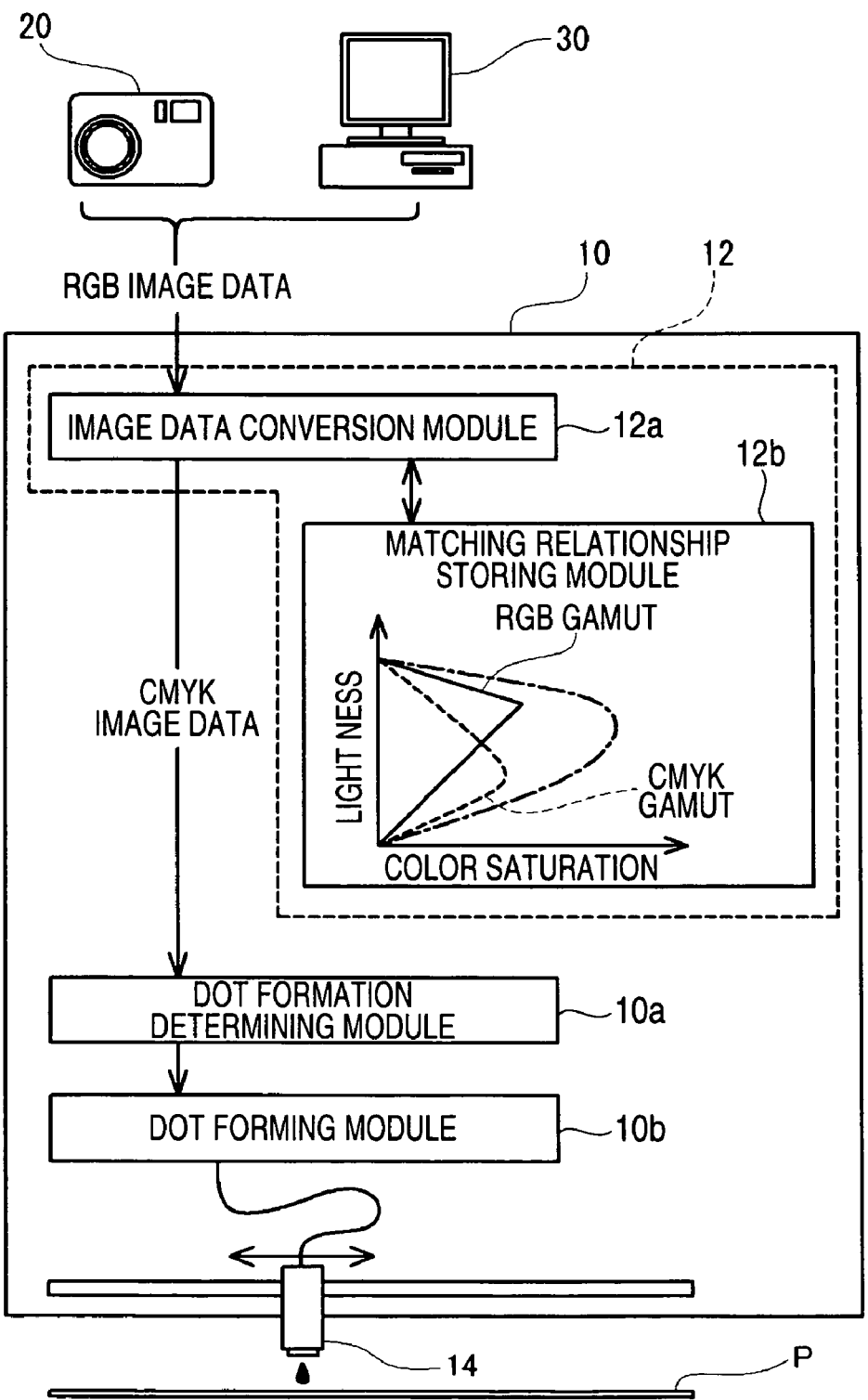
FIG. 1 is a schematic view showing a printer incorporating an image data converter according to a first embodiment of the invention.

FIG. 1 schematically shows a printer 10 incorporating an image data converter according to a first embodiment of the invention. The printer 10 illustrated therein is a so-called ink jet printer that receives color image data captured by a digital camera 20 and color image data prepared by a computer 30, converts the image data, and thereafter prints a color image by forming ink dots by ejecting ink droplets onto a printing medium P.

The printer 10 illustrated is composed of a data processor for executing predetermined image processing on image data, which consists of a CPU and a RAM, and an ink ejection head 14 for forming dots by ejecting ink droplets onto a printing medium P. Also, focusing attention on the functions of the data processor, it can be understood that the same section is composed of various types of modules, which are an image data conversion module 12a, a matching relationship storing module 12b, a dot formation determining module 10a, and a dot forming module 10b.

The image data conversion module 12a converts RGB image data, which are received from the digital camera 20 and the computer 30, etc., to CMYK image data. This is because it is necessary to convert data formats of image data prior to original images since various types of printers reproduce colors using four colors consisting of C (cyan), M (magenta), Y (yellow), which are called the three primary colors of ink, and K (Black) added thereto while a general imaging device such as a digital camera 20 and a computer 30 reproduces colors using three colors of R (red), G (green) and B (blue) which are called the three primary colors of light.

In addition, thus, in compliance with a difference in the method of reproducing colors, there is a deviation between the range of colors (gamut) which can be reproduced by the digital camera 20 and the computer 30 and the range of colors which can be reproduced by the printer 10. And, there exist colors that can be reproduced by the digital camera 20 or the computer 30 but cannot be reproduced by the printer 10. In a case where such colors are included in the color image data received from the digital camera 20, it is necessary that the colors be changed to other colors that can be reproduced by the printer 10. To the contrary, there exist colors that cannot be reproduced by the digital camera 20 and the computer 30 but can be reproduced by the printer 10. Therefore, it is possible to print further favorable color images if parts of colors included in the color image data received from the digital camera 20, etc., are changed to such colors (that is, colors that can be reproduced by the printer 10 although being unable to be reproduced by the digital camera 20). For example, if such colors are included in color images, the digital camera 20 and the computer 30 change colors to other colors that can be reproduced, and supply the thus obtained color image data to the printer 10. Therefore, when the printer 10 prints color images, it is possible to print further adequate color images in a state where the colors thus changed are returned to the original colors. The image data conversion module 12a also carries out a process (which may be called "mapping") to obtain favorable color images by absorbing differences in such gamuts (gamuts) when the RGB image data are converted to the CMYK image data.

Such conversion of image data is executed with reference to the matching relationship stored in advance in the matching relationship storing module 12b. In this module, the RGB image data and the CMYK image data to which the RGB image data are converted are stored so as to cause these data to correspond to each other. In regard to the RGB image data and the CMYK image data, image data indicative of the same colors are caused to correspond to each other in principle. However, as described above, since there is a deviation in gamuts between the RGB image data and the CMYK image data, the RGB image data and the CMYK image data are caused to correspond to each other so that a deviation in gamuts can be adequately absorbed. Since the image data conversion module 12a converts the RGB image data to the CMYK image data with reference to the matching relationship stored in the matching relationship storing module 12b, these two modules serve as the image data converter 12.

The image data conversion module 12a supplies image data to the dot formation determining module 10a after converting the RGB image data to the CMYK image data. The dot formation determining module 10a determines whether or not dots are formed for respective pixels to compose an image, on the basis of the CMYK image data in regard to respective colors of C, M, Y and K. And, the module outputs the results of determination to the dot forming module 10b. Based on the results of determination, which are received from the dot formation determining module 10a, on whether or not dots of respective colors of C, M, Y and K are formed, the dot forming module 10b drives the ink ejection head 14 and ejects ink droplets. As a result, ink dots of respective colors are formed on the printing medium P, and a color image is printed.

Here, the matching relationship stored in the matching relationship storing module 12b described above is established as described below. First, the third gamut is established, which comprehends a gamut based on the RGB image data (shown by a solid line and denoted as RGB in FIG. 1), which can be reproduced by the digital camera 20 and the computer 30, and a gamut based on the CMYK image data (shown by a dashed line and denoted as CMYK in FIG. 1), which can be reproduced by the printer 10. In FIG. 1, the third gamut is shown by a chain line. Next, mapping is executed so as to extend data in the gamut based on the RGB, to data in the third gamut. Then, mapping is executed so as to compress the data in the third gamut to data in the gamut based on CMYK. As a result, the gamut based on the RGB is converted to the gamut based on the CMYK via the third gamut.

Generally, as the gamut based on the RGB is intended to be directly converted to the gamut based on the CMYK without the third gamut, areas in which the gamut is extended and areas in which the gamut is compressed exist in a mixed state, and restriction is increased when mapping data in the gamut to another gamut. On the other hand, in a case of using the third gamut, since there is no case where extension and compression of the gamut are mixed, no large restriction is given when mapping data. Therefore, even in a case where gamuts are converted so as to adequately absorb a deviation in the gamuts in a state where original colors are maintained as much as possible in areas where the gamut based on the RGB overlaps the gamut based on the CMYK, it is possible to achieve adequate mapping because less restriction is provided. Hereinafter, a detailed description is given of a printer 10, which converts image data using such mapping, with reference to an embodiment.

Figure 2:
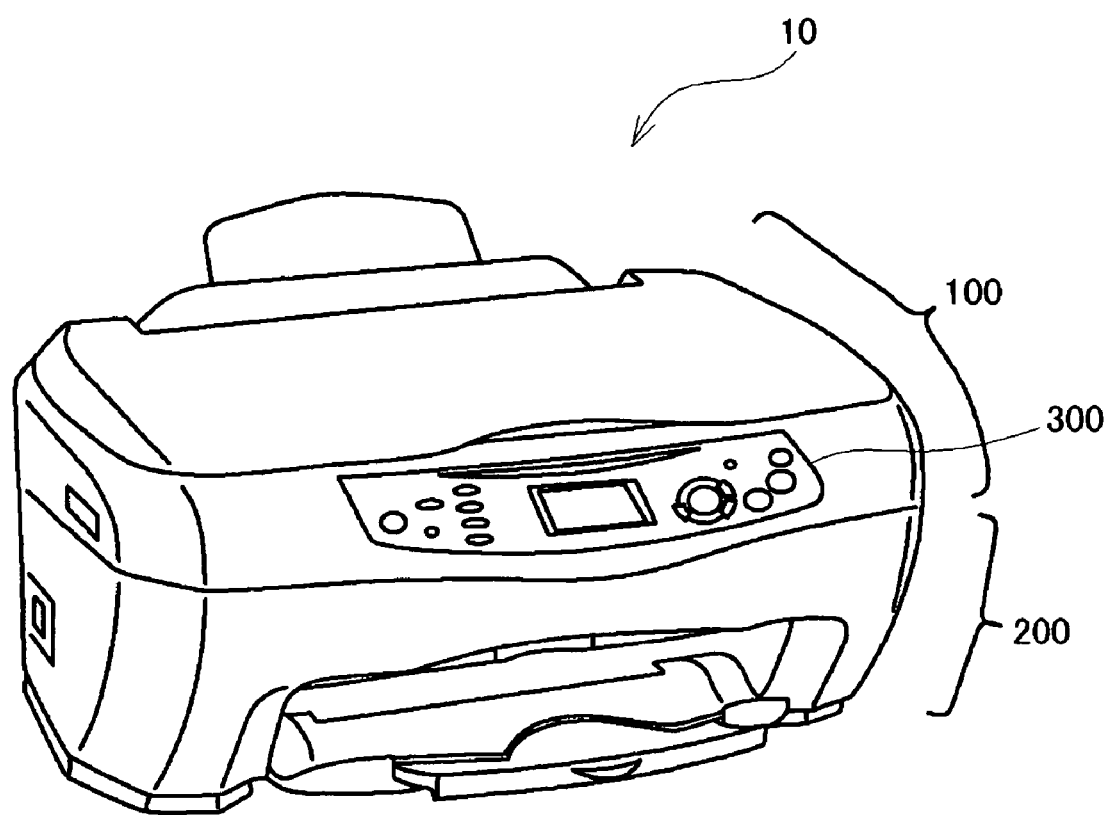
FIG. 2 is a perspective view of the printer.

As shown in FIG. 2, the printer 10 comprises a scanner section 100, a printer section 200, and an control panel 300 for controlling operations of the scanner section 100 and the printer section 200. The scanner section 100 has a scanner function for reading a printed image (original) and generating color image data, and the printer section 200 has a printer function for receiving the color image data and printing an image on a printing medium. In addition, if the color image read from the scanner section 100 is outputted from the printer section 200, a copy function can be achieved. That is, a printer 10 is a so-called hybrid apparatus serving as a scanner, a printer and a copier.

Figure 3:
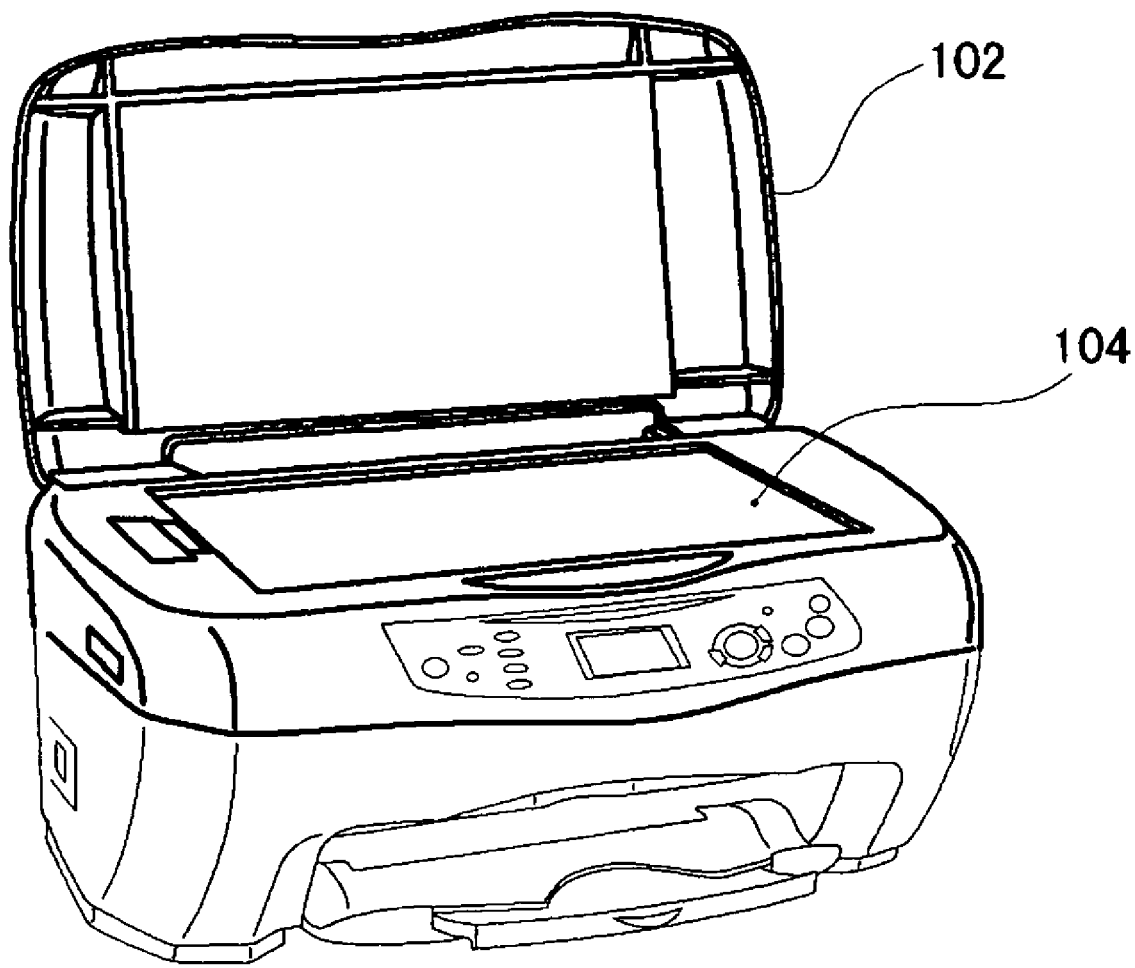
FIG. 3 is a perspective view of the printer, showing a state that a top cover is opened.

When a top cover 102 is opened upward, a transparent table 104 is exposed as shown in FIG. 3. Various kinds of mechanisms for achieving the scanner function, are incorporated below the transparent table 104. When reading an original, the top cover 102 is opened and the original is placed on the transparent table 104. Then, the top cover 102 is closed and buttons on the control panel 300 are operated. Thereby, the original image can be immediately converted to color image data.

Figure 4:
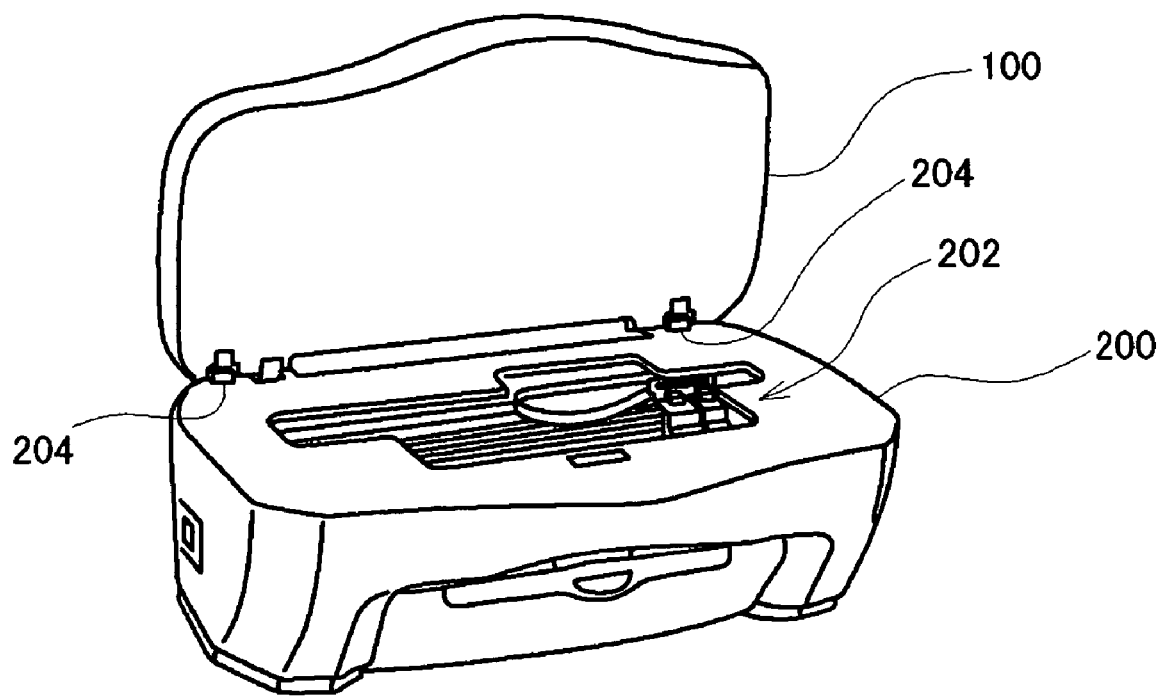
FIG. 4 is a perspective view of the printer, showing a state that a scanner section is lifted up.

The scanner section 100 and the printer section 200 are coupled to each other by hinges 204 (see FIG. 4) at the back side of the printer 10. Therefore, when the front side of the scanner section 100 is lifted up, the scanner section 100 can be pivoted backward as shown in FIG. 4.

In this state, the upper face of the printer section 200 is exposed. Various kinds of mechanisms for achieving the printer function, a controller 260 which controls the entire operations of the printer 10 including the scanner section 100, and a power circuit (not illustrated) for supplying power to the scanner section 100 and the printer section 200 are incorporated in the printer section 200. Also, as shown in FIG. 4, an opening 202 is provided on the upper face of the printer section 200, wherein it is possible to easily execute replacement of consumables such as an ink cartridge, and simple repair such as treatment of paper jamming.

Figure 5:
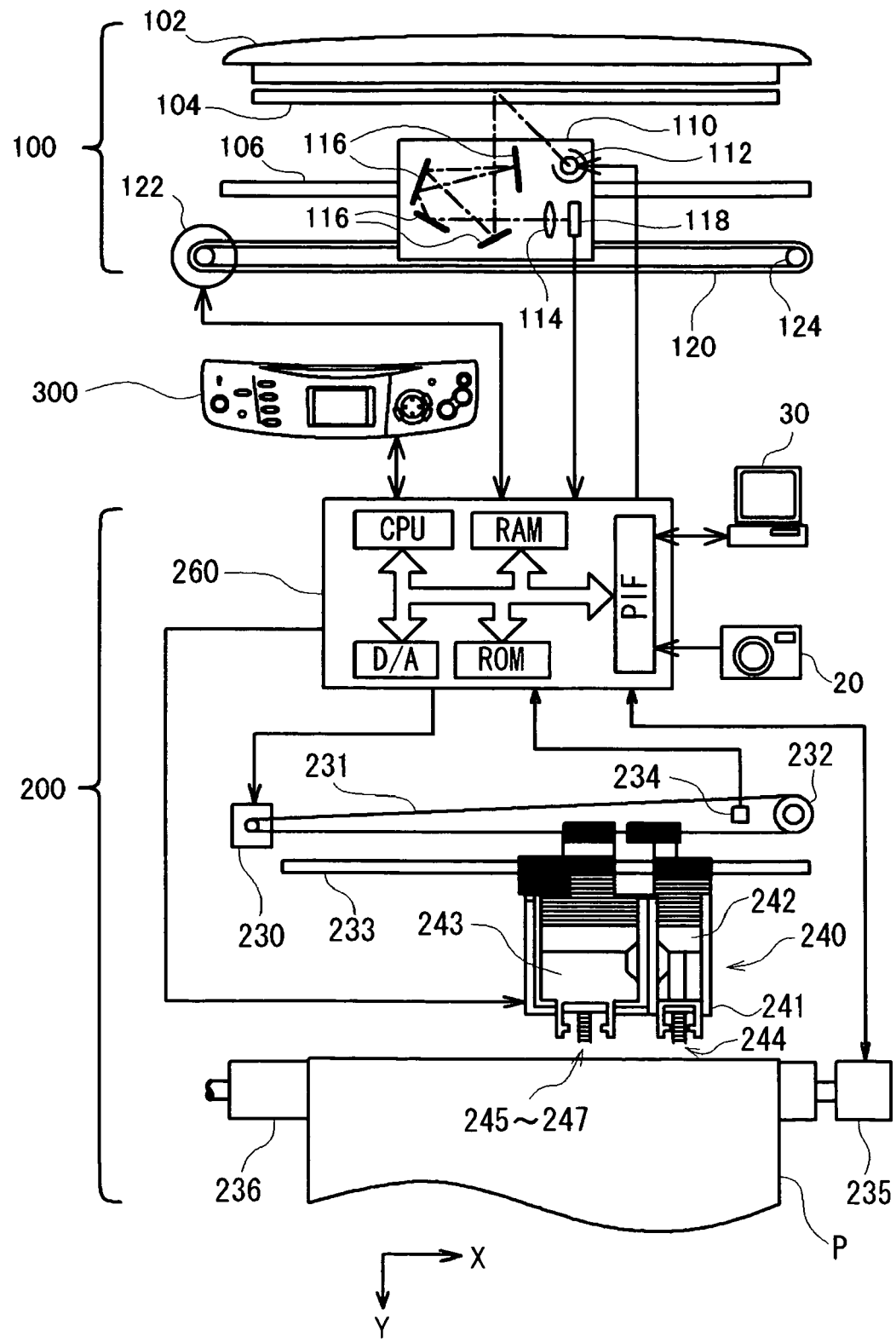
FIG. 5 is a schematic view showing an internal configuration of the printer.

Next, with reference to FIG. 5, a description is first given of the internal configuration of the scanner section 100, and then is given of the internal configuration of the printer section 200.

The scanner section 100 comprises: the transparent table 104 on which an original image is placed; the top cover 102 to retain the original image on the transparent table; a scanner carriage 110 operable to read the above original image; a driving belt 120 for moving the scanner carriage 110 in a primary scanning direction X; a driving motor 122 for supplying power to the driving belt 120; and a guide shaft 106 for guiding the movement of the scanner carriage 110. In addition, operations of the driving motor 122 and the scanner carriage 110 are controlled by the controller 260.

As the driving motor 122 is rotated under control of the controller 260, the movement thereof is transmitted to the scanner carriage 110 via the driving belt 120. As a result, the scanner carriage 110 is designed to move in the primary scanning direction X in accordance with a rotation angle of the driving motor 122 while being guided by the guide shaft 106. Also, the driving belt 120 is always adjusted to adequate tension by an idler pulley 124. Accordingly, it is possible to cause the scanner carriage 110 to move in a reverse direction in accordance with the rotation angle if the driving motor 122 is reversed.

A light source 112, a lens 114, mirrors 116, and a CCD sensor 118 are incorporated in the scanner carriage 110. Light emitted from the light source 112 is irradiated onto the transparent table 104, and is reflected by a original image set on the transparent table 104. The reflection light is guided to the lens 114 by the mirrors 116, is condensed by the lens 114, and detected by the CCD sensor 118. The CCD sensor 118 is composed of a linear sensor in which photo diodes for converting the light intensity to electrical signals are arrayed in the direction orthogonal to the primary scanning direction X of the scanner carriage 110. Therefore, while moving the scanner carriage 110 in the primary scanning direction X, the light emitted from the light source 112 is irradiated onto the original image and the reflection light intensity is detected by the CCD sensor 118, whereby the original image can be converted to electrical signals.

Also, the light source 112 is composed of light emitting diodes of three colors which are RGB. The light source 112 can sequentially emit red light, green and blue at a predetermined cycle, so that the CCD sensor 118 detects reflection red light, green and blue sequentially. Generally, red portions of an image reflect red light, and almost no green light and blue are reflected. Therefore, the reflection red light will reproduce red components of the image. Similarly, the reflection green light reproduces green components of the image, and the reflection blue light reproduces blue components of the image. Therefore, if light of three colors, which are RGB, is irradiated onto an original image while being switched at a predetermined cycle, and the CCD sensor 118 detects the intensities of the reflection light in synchronization therewith, it is possible to detect red components, green components and blue- components of the original image, wherein a color image can be read. Also, since the scanner carriage 110 is moving while the light source 112 is switching the colors of light to be irradiated, the positions of an image from which respective components of RGB are detected differ from each other equivalent to the movement amount of the scanner carriage 110. However, the deviation can be corrected by image processing after the respective components are read.

The printer section 200 comprises: the controller 260 for controlling the entire operation of the printer 10; a printer carriage 240 for printing an image onto a printing medium; a mechanism for moving the printer carriage 240 in the primary scanning direction X; and a mechanism for transporting the printing medium P.

The printer carriage 240 carries an ink cartridge 242 for accommodating black ink, an ink cartridge 243 for storing various kinds of ink such as cyan ink, magenta ink, and yellow ink; and a head unit 241 secured on the bottom face of the printer carriage 240. In the head unit 241, ink ejection heads operable to eject ink droplets are provided ink by ink. As the ink cartridges 242 and 243 are mounted on the printer carriage 240, respective colors of ink in the cartridges are supplied to the ink ejection head 244-247 of the respective colors through ink supplying passages (not illustrated). In this embodiment, cyan ink, magenta ink and yellow ink are integrally stored in a single ink cartridge 243. However, each of these colors of ink may be stored in an individual ink cartridge. Further, in addition to these colors of ink, at least one of light cyan ink, light magenta ink, light black ink, red ink, violet ink and orange ink may be used.

The mechanism for moving the printer carriage 240 in the primary scanning direction X is composed of: a carriage belt 231 for driving the printer carriage 240; a carriage motor 230 for supplying power to the carriage belt 231; a tension pulley 232 for always applying adequate tension to the carriage belt 231; a carriage guide 233 for guiding movement of the printer carriage 240; and a position sensor 234 for detecting a reference position of the printer carriage 240. When the carriage motor 230 is rotated under control of the controller 260 described later, it is possible to move the printer carriage 240 in the primary scanning direction X only by a distance corresponding to the rotation angle of the carriage motor 230. When the carriage motor 230 is reversed, the printer carriage 240 can be reversely moved.

The mechanism for transporting a printing medium P is composed of: a platen 236 for supporting the printing medium P from the back side thereof; and a transporting motor 235 for transporting the printing medium P by rotating the platen 236. When the transporting motor 235 is rotated under control of the controller 260, it is possible to transport the printing medium P in a secondary scanning direction Y only by a distance corresponding to the rotation angle of the transporting motor 235.

The controller 260 comprises a CPU; a ROM; a RAM; a D/A converter to convert digital data to analog signals; and a peripheral device interface PIF to communicate data among peripheral devices. The controller 260 controls the entire operations of the printer 10 including the scanner section 100, the printer section 200 and the control panel 300, and controls these operations through communicating data among the light source 112, the driving motor 122 and the CCD sensor 118, which are incorporated in the scanner section 100.

Further, while the controller 260 executes the primary scanning and the secondary scanning of the printer carriage 240 by driving the carriage motor 230 and the transporting motor 235. The controller 260 controls the ejection of ink droplets by supplying drive signals to the ink ejection heads 244-247 of the respective colors. The drive signals supplied to the ink ejection head 244-247 are generated by reading color image data from the computer 20 and the digital camera 30, and executing an image processing described later. As a matter of course, it also is possible to generate the drive signals by executing an image processing for the color image data read from the scanner section 100. Thus, it is possible to print a color image by forming ink dots of respective colors on a printing medium P by ejecting ink droplets from the ink ejection heads 244-247 while executing the primary scanning and the secondary scanning of the printer carriage 240 under control of the controller 260. As a matter of course, an image processing is not executed in the controller 260 but it is possible to drive the ink ejection heads 244-247 while executing primary scanning and secondary scanning of the printer carriage 240 in compliance with data, for which an image processing has been executed, received from the computer 20.

The controller 260 is connected to the control panel 300 so that data can be communicated therebetween. By operating various types of buttons secured on the control panel 300, detailed operation modes of the scanner function and the printer function can be set. It is possible for the computer 20 to set detailed operation modes via the peripheral device interface PIF.

Figure 6:
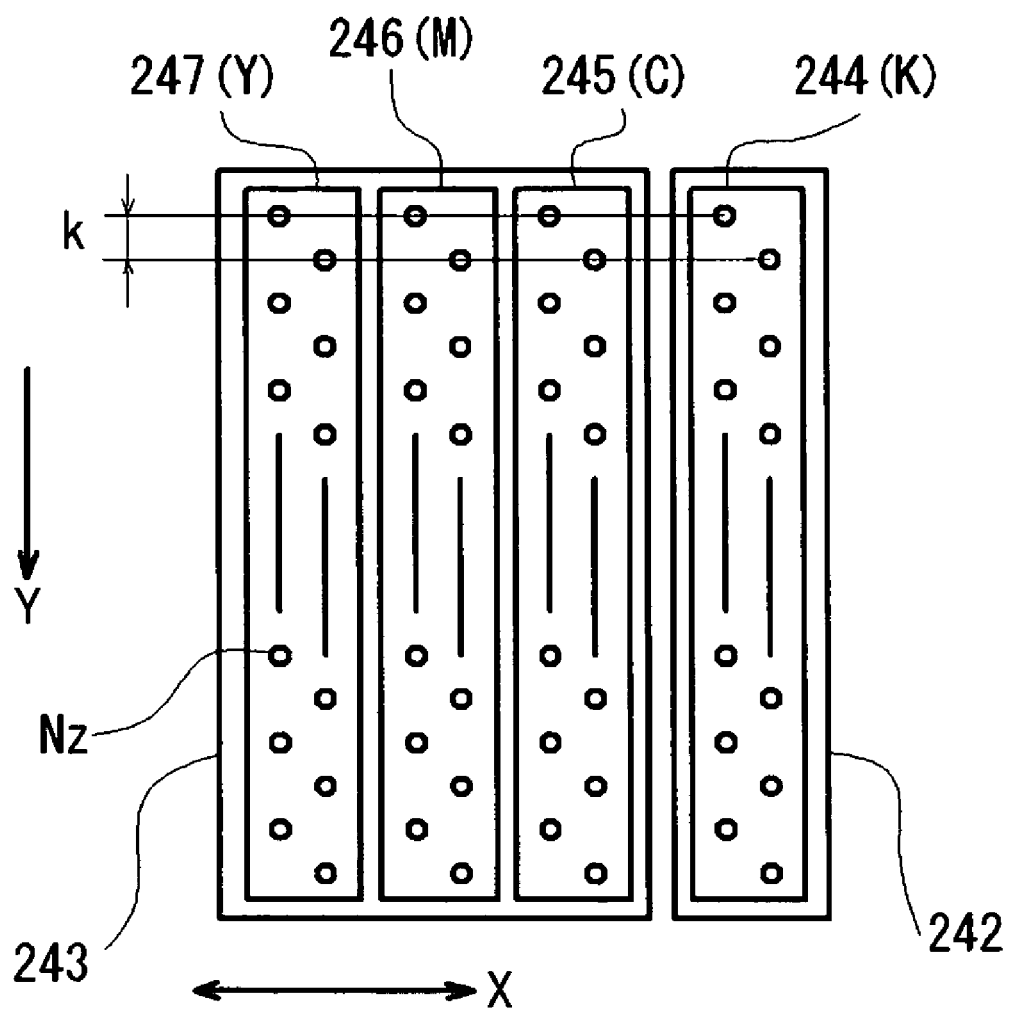
FIG. 6 is a schematic plan view showing nozzle orifices of ink ejection heads in the printer.

As shown in FIG. 6, a plurality of nozzle orifices Nz adapted to eject ink droplets are formed in the ink ejection heads 244-247 of respective colors. As illustrated, four sets of nozzle arrays are formed on the bottom faces of the ink ejection heads 244-247, and 48 nozzle orifices Nz are provided in a zigzag manner with a fixed pitch k for each of the nozzle array. Drive signals are supplied from the controller 260 to respective ink ejection heads 244-247, and the respective nozzle orifices Nz eject ink droplets of respective colors in compliance with the drive signals.

Various methods are available as the method for ejecting ink droplets from the ink ejection heads. That is, a system for ejecting ink using piezoelectric elements, and a system for ejecting ink droplets by generating bubbles in an ink chamber by a heater disposed in the ink chamber may be used. In addition, such printers also may be used, which are based on a system for forming ink dots on a printing medium by utilizing a phenomenon such as thermal transfer and a system for adhering toner powder of respective colors onto a printing medium utilizing static electricity.

As described above, in order to print a predetermined image by the printer section 200, it is necessary to execute an adequate image print processing with respect to color image data, to generate drive signals for respective nozzle orifices, thereby forming dots based on the drive signals. Hereinafter, a description is given of such an image print processing. In this embodiment, the image processing is executed by the controller 260 incorporated in the printer section 200. However, dots may be formed by executing the image processing at the computer 20 and reading the processed data by way of the peripheral device interface PIF.

Figure 7:
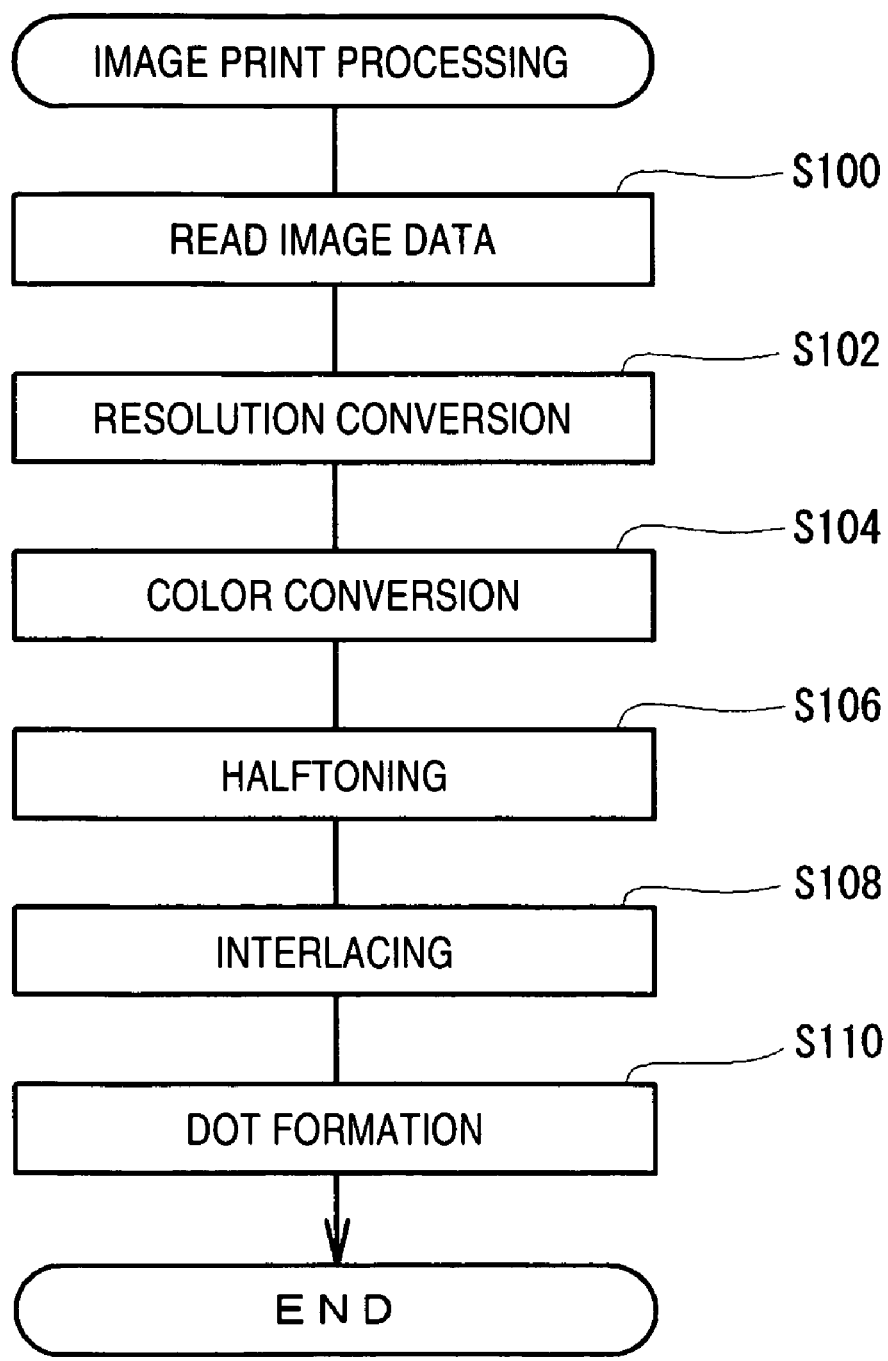
FIG. 7 is a flowchart showing an image print processing executed in the printer.

As shown in FIG. 7, when an image print process is executed, first the controller 260 reads color image data of an image to be printed (Step S100). Herein, the color image data are RGB image data reproduced by gradation values of respective colors R, G and B.

Next, a process that converts the resolution of the read color image data to a resolution at which the printer section 200 can print (that is, the printing resolution) (Step S102). Where the resolution of the read color image data is lower than the printing resolution, the resolution can be converted to a higher resolution by setting new image data by making an interpolation calculation between adjacent pixels. To the contrary, where the resolution of the read color image data is higher than the printing resolution, the resolution can be converted to a lower resolution by thinning image data between adjacent pixels at a fixed ratio.

Thus, after having converted the resolution of the color image data to the printing resolution, the controller 260 commences a color conversion (Step S104). The color conversion is such a process that RGB image data reproduced by combinations of gradation values of R, G and B are converted to data corresponding to the use amounts of respective colors of ink mounted in a printer. As described above, since the printer section 200 prints an image using four colors of ink C, M, Y and K (cyan, magenta, yellow and black), the color conversion according to the embodiment converts RGB image data to data of gradation values (CMYK image data) corresponding to the use amounts of respective colors of ink C, M, Y and K. In a case where at least one of light cyan (LC) ink, light magenta (LM) ink and light black (LK) ink is used in addition to the above four colors of ink, the RGB image data may be converted to data of gradation values corresponding to the use amounts of respective colors of ink with these added light colors of ink.

Further, with respect to the RGB image data indicative of colors by respective colors of R, G and B and the CMYK image data indicative of colors by respective colors of C, M, Y and K, the ranges (gamuts) of colors that can be reproduced differ from each other. Therefore, a process called mapping to absorb differences in such ranges is executed simultaneously with the color conversion to convert the RGB image data to the CMYK image data.

Figure 8:
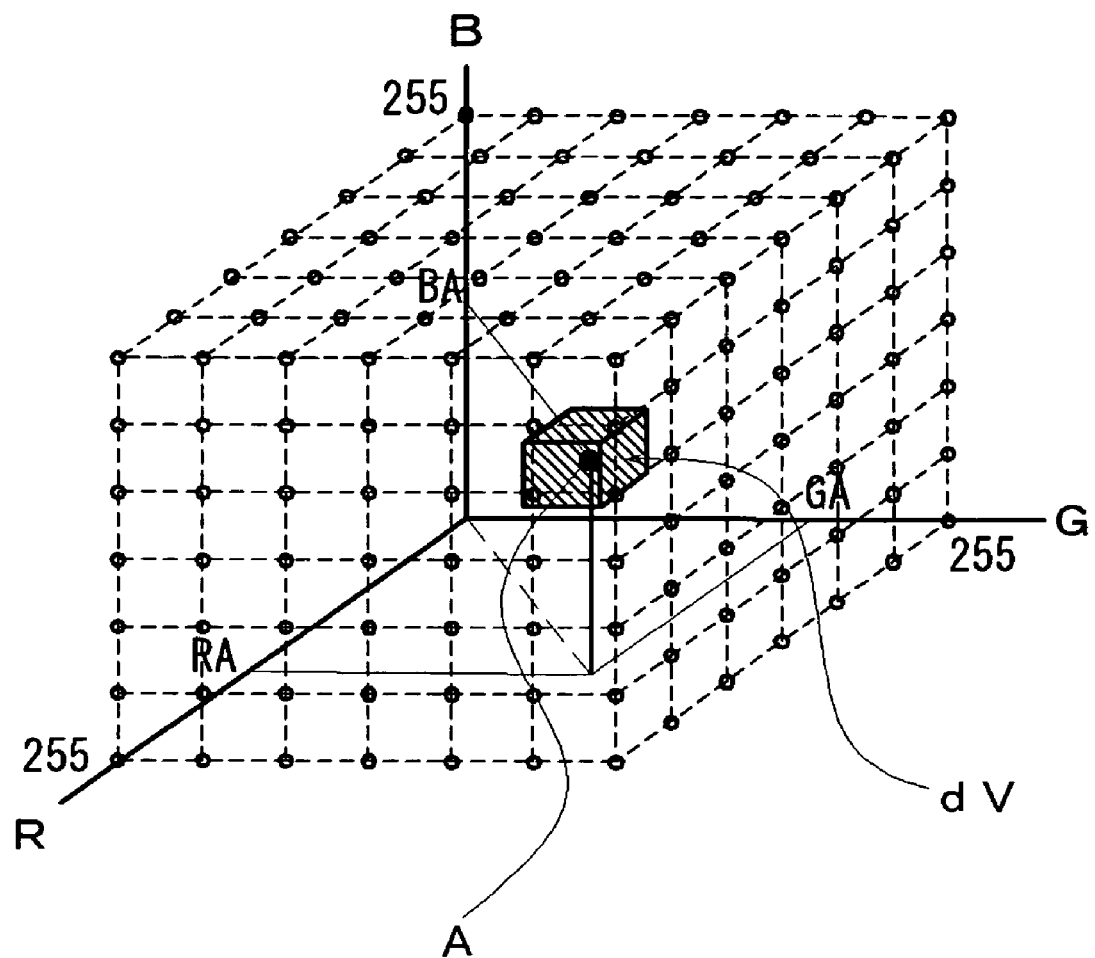
FIG. 8 is a diagram showing a concept of a color conversion executed in the printer.

The color conversion is executed with reference to a three-dimensional numerical table called a color conversion table (Look-Up Table: LUT). As shown in FIG. 8, it is assumed that the gradation values of respective colors R, G and B take values 0 through 255 and color spaces which take the gradation values of respective colors R, G, and B are provided in three axes orthogonal to each other, wherein all the RGB image data are caused to correspond to internal points of a cube (color cube) the one side length of which is 255. When the viewpoint is changed from here, and a plurality of lattice points are generated in color spaces by fragmenting a color cube in the form of a lattice orthogonally to the respective axes of R, G and B, it can be considered that the respective lattice points correspond to the RGB image data. Therefore, combinations of gradation values corresponding to the use amounts of respective colors of ink C, M, Y and K are stored in the respective lattice points in advance. Accordingly, it is possible to quickly convert the R, G and B image data to the data (C, M, Y and K image data) corresponding to the use amounts of respective colors by reading the gradation values stored in the lattice points.

For example, where it is assumed that the red component of the image data is RA, the green component is GA, and the blue component is BA, the image data are caused to correspond to point A in the color space. Therefore, a cube dV internally containing the point A is detected from small cubes obtained by fragmenting the color cube in the form of a lattice, and the gradation values of the respective color inks, which are stored in the respective lattice points of the cube dV, are read out. And, it is possible to obtain the gradation values at the point A by executing an interpolation calculation from the graduation values of the respective lattice points. As described above, the look-up table (LUT) can be considered to be a three-dimensional numerical table in which combinations (CMYK image data) of gradation values corresponding to the use amounts of respective color ink C, M, Y and K are stored at the respective lattice points reproduced by combinations of the gradation values of respective colors R, G and B. Referring to the look-up table, it is possible to quickly execute color conversion from the RGB image data to the CMYK image data.

Actually, the CMYK image data set at the respective lattice points of the look-up table are made into data that not only convert the color reproduction system from the reproduction system based on the respective colors of RGB to the reproduction system based on the respective colors of CMYK but also absorb differences in the gamuts between the RGB image data and the CMYK image data. And, since the look-up table according to the embodiment is established by a method described later, a color conversion can be executed while adequately absorbing differences in the gamuts, and furthermore, it is possible to print high quality color images.

In the image print processing shown in FIG. 7, after a color conversion is executed with reference to the look-up table as described above, a halftoning is subsequently executed (Step S106). In this processing, the gradation data (CMYK image data) corresponding to the ink use amounts of respective colors of CMYK, which are obtained by the color conversion, are such that a value from 0 for the gradation value to 255 for the gradation value may be taken pixel by pixel. On the other hand, since an image is displayed by forming dots in the printer section 200, there is only a state for whether or not a dot is formed for respective pixels. Therefore, it is necessary to convert the CMYK image data having 256 gradations to data (dot data) reproducing whether or not a dot is formed per pixel. In summary, the halftoning is a process for converting the CMYK image data to dot data.

Various methods such as an error diffusion method and a dither method may be applicable as the method for executing a halftoning. The error diffusion method diffuses errors in gradation reproduction, which are generated in a pixel by having determined whether or not a dot has been formed in regard to the pixel, to surrounding pixels, and at the same time, determines whether or not dots are formed in regard to respective pixels so that errors diffused from the periphery are absorbed. The dither method is a method for obtaining dot data with respect to the respective pixels, which compares the threshold values established in a dither matrix at random with the CMYK image data pixel by pixel, wherein it is determined that dots are formed in pixels in which the CMYK image data are greater, and, to the contrary, it is determined that dots are not formed in pixels in which the threshold values are greater.

FIG. 9 shows a dither matrix with a part thereof enlarged. In the matrix shown, threshold values universally selected from a range in which the gradation value is 0 through 255 are arranged in 4096 pixels consisting of 64 pixels at both the horizontal side and vertical side at random. The reason why the gradation value of the threshold values is selected from a range from 0 through 255 resides in that the CMYK image data is 1 byte data in the embodiment and the gradation values obtain a value from 0 through 255. Further, the size of the dither matrix is not limited to 64 pixels in both the horizontal and vertical directions, but it may be established to various sizes including a matrix in which the number of pixels in one direction differs from that in the other direction.

Such determination is executed for respective colors of the CMYK. However, to avoid complicated explanation in the following description, it is assumed that the CMYK image data are simply referred to as image data without discriminating the respective colors thereof.

Figure 10:
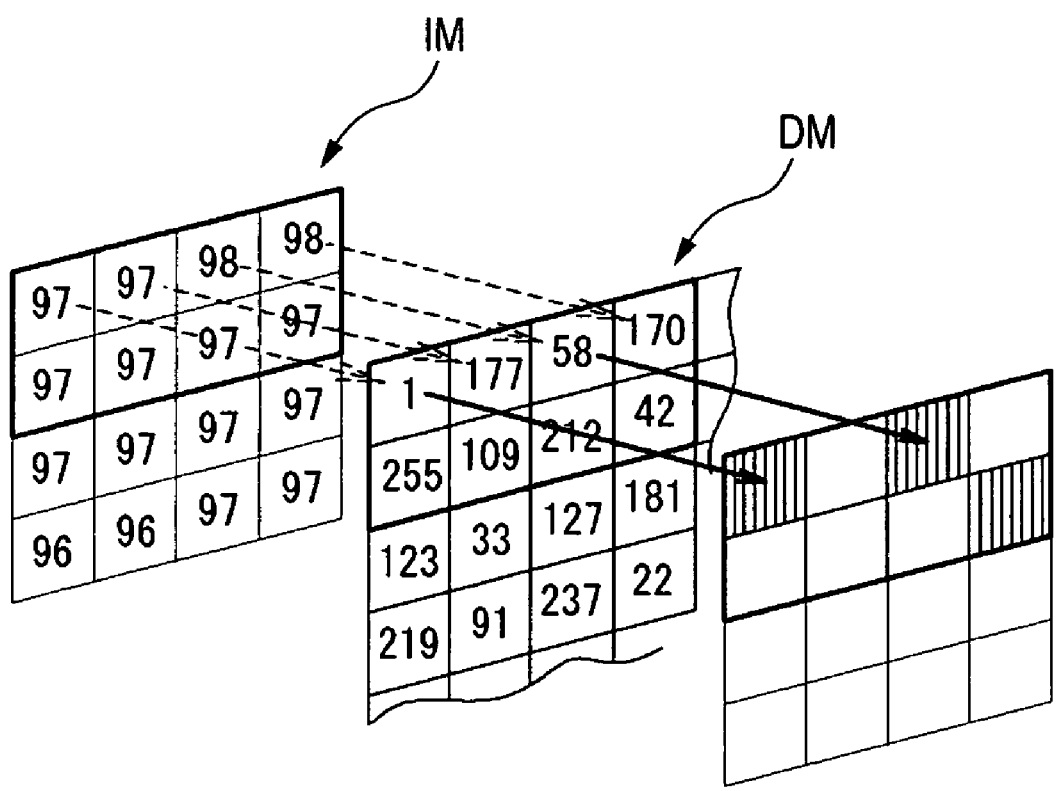
FIG. 10 is a diagram showing a concept of the halftoning.

To determine whether or not dots are formed, first, the gradation value of image data IM for a pixel of interest is compared with the threshold value stored in the corresponding position in the dither matrix DM. The arrows, depicted by dashed lines, which are shown in FIG. 10 schematically express a state where the image data IM of the pixel of interest are compared with the threshold value stored in the corresponding position of the dither matrix DM. When the image data IM of the pixel of interest are greater than the threshold value of the dither matrix DM, it is determined that dots are formed for the pixel. To the contrary, when the threshold value of the dither matrix DM is greater, it is determined that no dots are formed for the pixel. In the example shown in FIG. 10, the image data IM of a pixel located at the left upper corner of the image is "97" while the threshold value stored in the position corresponding to the pixel in the dither matrix DM is "1". Therefore, in connection to the pixel located at the upper left corner, since the image data IM are greater than the threshold value of the dither matrix DM, it is determined that a dot is formed for this pixel. The arrows depicted by solid lines in FIG. 10 schematically express a state where a result of determination is written in a memory by determining that dots are formed for the pixels. On the other hand, in regard to the pixel next to the above pixel at the right side thereof, since the image data IM are "97" and the threshold value of the dither matrix DM is "177", and the threshold value is then greater, it is determined that no dot is formed for this pixel. Thus, by comparing the image data IM with the threshold value set in the dither matrix DM, it is possible to determine pixel by pixel whether or not dots are formed.

In summary, by executing the above-described halftoning with respect to the CMYK image data obtained by the color conversion, dot data, which expresses whether or not a dot is formed pixel by pixel is generated (Step S106 in FIG. 7).

After the CMYK image data are converted to dot data, interlacing (Step S108 in FIG. 7) is executed. The interlacing is a processing for re-arranging dot data in the order along which the head unit 241 forms dots and supplies the dot data to the ink ejection heads 244-247 of respective colors of ink. That is, as shown in FIG. 6, since the nozzle orifices Nz in the ink ejection heads 244-247 are arranged in the secondary scanning direction Y with spacing equivalent to the pitch k, dots are formed with spacing equivalent to the pitch k remaining in the secondary scanning direction Y if ink droplets are ejected while moving the printer carriage 240 for the primary scanning. Therefore, in order to form dots for all the pixels, it is necessary to form new dots in pixels between dots each spaced by the pitch k by moving the relative positions of the printer carriage 240 and a printing medium P in the secondary scanning direction Y. Thus, where an image is actually printed, dots are not formed sequentially from the pixels located upward of the image. Further, in regard to the pixels located in the same row in the primary scanning direction X, dots are not formed by a single primary scanning, but dots are formed through a plurality of primary scannings from a demand for image quality. Therefore, it has widely been executed that dots are formed for dots located at skipped positions in respective primary scannings.

After the interlacing is finished, a process of actually forming dots on a printing medium (that is, a dot formation) is executed based on the data obtained by the interlacing (Step S110 in FIG. 7). That is, the dot data whose sequence has been re-arranged are supplied to the ink ejection heads 244-247 while driving the carriage motor 230 and moving the printer carriage 240 for the primary scanning. As described above, since the dot data are data indicative of whether or not dots are formed for respective dots, it is possible to adequately form ink dots for respective pixels if the ink ejection heads 244-247 eject ink droplets in compliance with the dot data.

After the primary scanning is finished one time, the transporting motor 235 is driven, and a printing medium is fed in the secondary scanning direction Y. Next, the dot data whose sequence has been re-arranged are supplied to the ink ejection heads 244-247 to form dots while driving the carriage motor 230 again and moving the printer carriage 240 for primary scanning. By repeating such an operation, dots of respective colors C, M, Y and K are formed in adequate distribution corresponding to the gradation values of the image data, thereby obtaining an image.

Next, a description is given of a method for setting a look-up table which is referred to in the color conversion.

Figure 11:
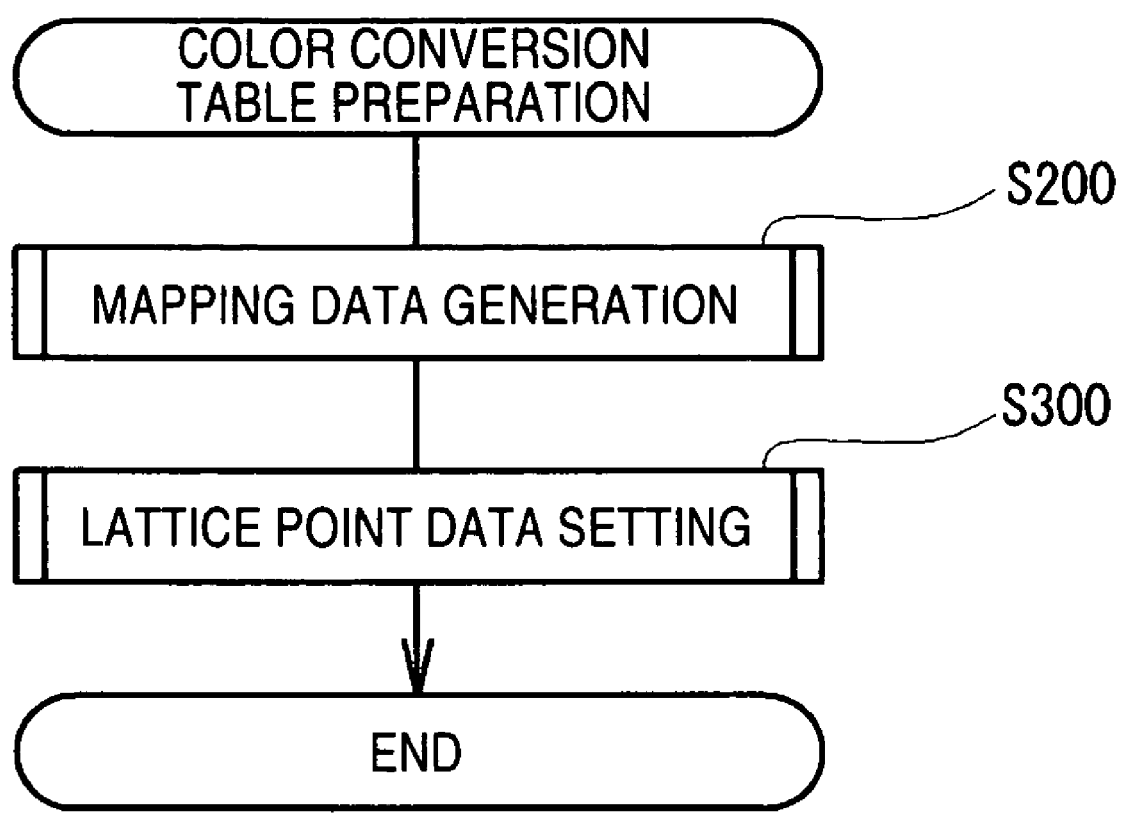
FIG. 11 is a flowchart showing a color conversion table preparation processing executed in the printer.

As shown in FIG. 11, the process for setting a look-up table is mainly composed of a process for generating mapping data (Step S200) and a process for setting lattice point data (Step S300). Of these, the process for setting mapping data generates data (that is, mapping data) in which the colors reproduced by RGB image data are caused to correspond to the colors reproduced by CMYK image data in order to absorb differences in gamuts between the RGB image data and the CMYK image data. In other words, it can be considered that the mapping data generation processing is a process for determining which colors of the CMYK image data is used to reproduce the colors expressed by the RGB image data in order to absorb differences in gamuts between the RGB image data and the CMYK image data. The process for generating lattice point data determines the CMYK image data established by respective lattice points of the look-up table in compliance with the mapping data.

Figure 12:
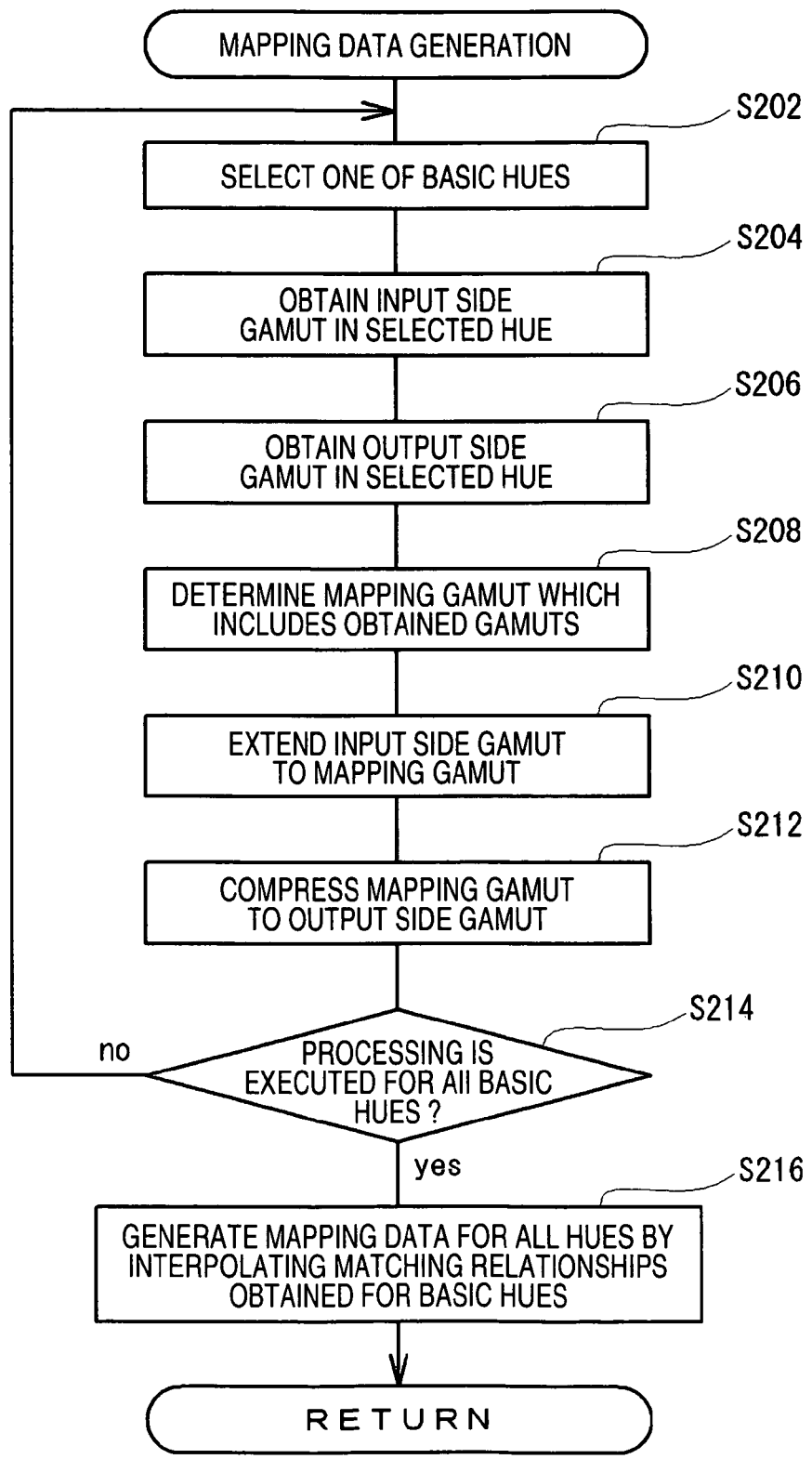
FIG. 12 is a flowchart showing a mapping data generation processing executed in the printer.

FIG. 12 shows a flow of the mapping data generation processing. As the process is executed, first, one basic hue which is a subject to be processed is selected (Step S202). In this step, three colors of red, green and blue that are called the three primary colors of light are now considered. These three colors are independent from each other. Even if any two colors are mixed, the remaining one color cannot be created. However, it is possible to create a complementary color of the remaining color. For example, green cannot be created even if red and blue are mixed at any ratio. However, magenta that is in a complementary relationship to green can be created if red and blue are mixed at the same ratio. Similarly, blue cannot be created even if red and green are mixed. However, yellow that is in a complementary relationship to blue can be created if red and green are mixed at the same ratio. In addition, if green and blue are mixed at the same ratio, cyan that is in a complementary relationship to red can be created. Further, cyan, magenta and yellow that are thus obtained are mixed, respective colors of red, green and blue can be created. For example, if cyan and magenta are mixed at the same ratio, blue can be obtained. When magenta and yellow are mixed at the same ratio, red can be brought about, and if cyan and yellow are mixed at the same ratio, green can be created.

Figure 13A:
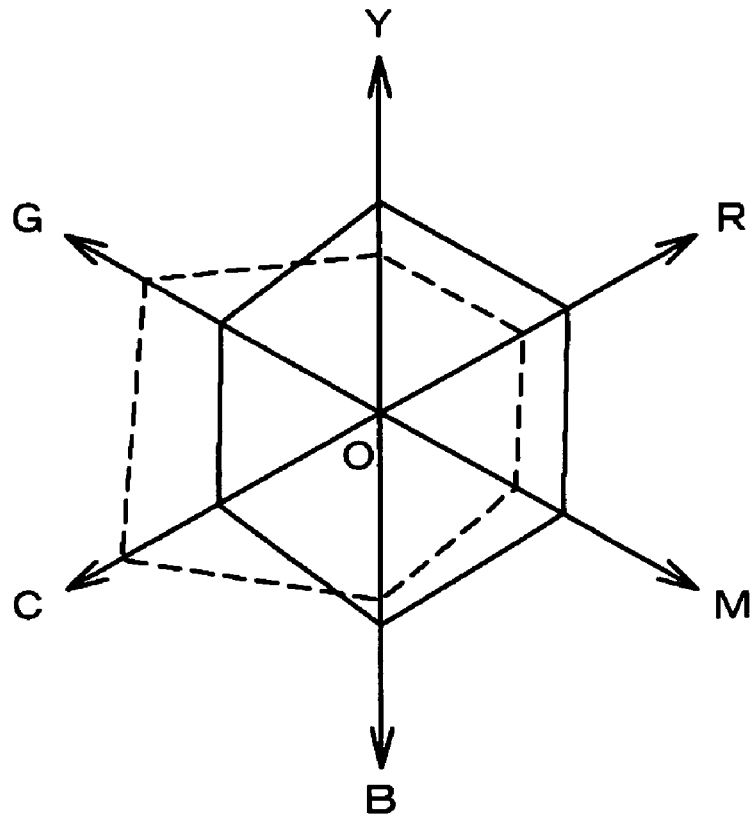
FIGS. 13A to 13C are diagrams for explaining differences in gamuts between RGB image data and CMYK image data.

Based on such relationship, it can be considered that hue has characteristics of circulation. That is, as shown in FIG. 13A, it can be considered that the entire perimeter of 360 degrees is divided into six directions each by 60 degrees, and six colors of yellow (Y), red (R), magenta (M), blue (B), cyan (C) and green (G) are allotted in the respective directions in order. According to such an expression, a difference in hue can be expressed by a difference in the direction (that is, a difference in angle), and lightness of color can be reproduced by the distance from the origin O. Further, the origin O represents an achromatic color (white, or black). When the center axis is erected at the origin O, and the coordinate of the axis represents lightness, it can be considered that the point at the coordinate value 0 on the axis represents black which is the darkest achromatic color, and the point that takes the upper limit coordinate value on the axis represents white which is the brightest achromatic color. Finally, where a columnar coordinate is taken into account, if lightness is placed at the center axis of the columnar coordinate, hue is placed in terms of an angle of the columnar coordinate, and color saturation is placed in terms of a distance from the center axis, all colors can be expressed by coordinate values of the columnar coordinate. The basic hue selected in Step S202 are any one of six hues shown in FIG. 13A.

Next, an input side gamut at the selected hue is acquired (Step S204). Generally, a color display and a color printer respectively have reproduceable gamuts. A solid line shown in FIG. 13A represents a gamut of the color display when being observed in the direction of lightness axis (that is, the direction along the center axis of the columnar coordinate), and a dashed line in the drawing represents a gamut of the color printer when being observed in the direction of lightness axis. As shown in FIG. 13A, the gamuts of the color display and the color printer are different from each other hue by hue.

Figure 13B:
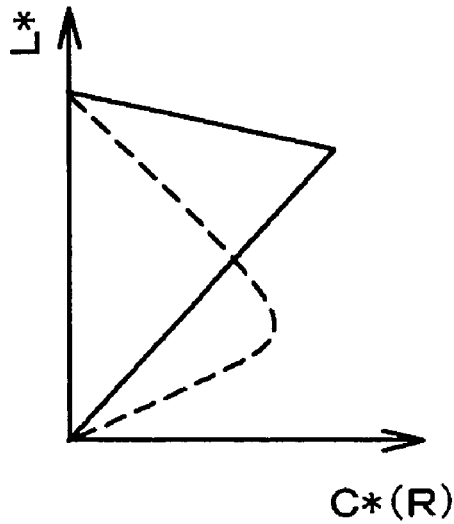
Figure 13C:
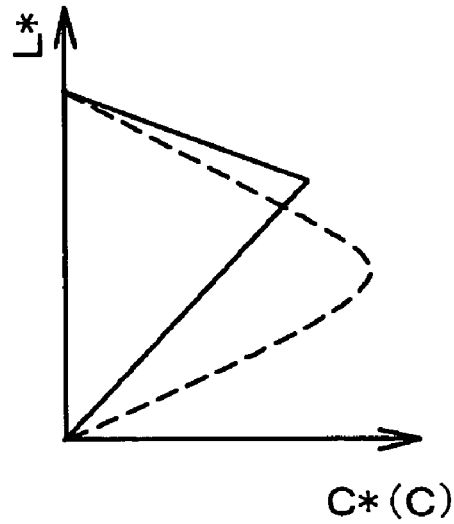

Further, since the colors are reproduced in the color display by using RGB colors of light, the intensity of color light is increased when attempting to reproduce colors of high color saturation. As a result, the lightness thereof is also increased. Therefore, there is a tendency that the gamut of the color display is widened to high color saturation in an area of high lightness. On the other hand, since, in the color printer, colors are reproduced using CMY colors of ink, the use amount of ink is increased when attempting to reproduce colors of high color saturation. As a result, the lightness is decreased. Therefore, there is a tendency that the gamut of the color printer is widened to high color saturation at an area of low lightness. Thus, the gamuts of the color display and the color printers differ depending on not only hue but also lightness. FIG. 13B is schematically shows a difference between the gamut of the color display and that of the color printer by taking a section at an angle when the red is selected as the basic hue. FIG. 13C schematically shows a difference in gamuts when the cyan is selected as the basic hue.

Thus, since the gamut of the color display and the gamut of the color printer differ, depending on the direction of hue and the lightness, in Step S204 in FIG. 12, a process for reading data showing the gamut at the input side at the hue first selected as the basic hue is executed. Herein, the input side gamut means a gamut reproduceable at an imaging device (in the embodiment, a color display used in the digital camera 20 and the computer 30) at the side of inputting color image data. Data indicative of a gamut at a specified hue are values of color saturation $C^*$ to respective lightness $L^*$ as illustrated in FIGS. 13B and 13C. Also, the color saturation $C^*$ is a mean squared value of $a^*$ and $b^*$ employed in the Lab color coordinate system. The data indicative of such a gamut is investigated in advance by an experimental method. In Step S204, such data may be read.

Next, with respect to hue previously selected as the basic hue, data of the output side gamut may be acquired (Step S206). Herein, the output side gamut is a gamut reproduceable at the color printer, and data indicative of the gamut of the color printer are investigated and stored in advance by an experimental method.

Thus, after the data of the input side gamut and data of the output side gamut are read, a process for setting a gamut for mapping, which includes these gamuts, is executed (Step S208). Herein, by selecting a gamut including the input side gamut and the output side gamut from several gamuts established in advance as candidates, the gamut for mapping is established.

Figure 14:
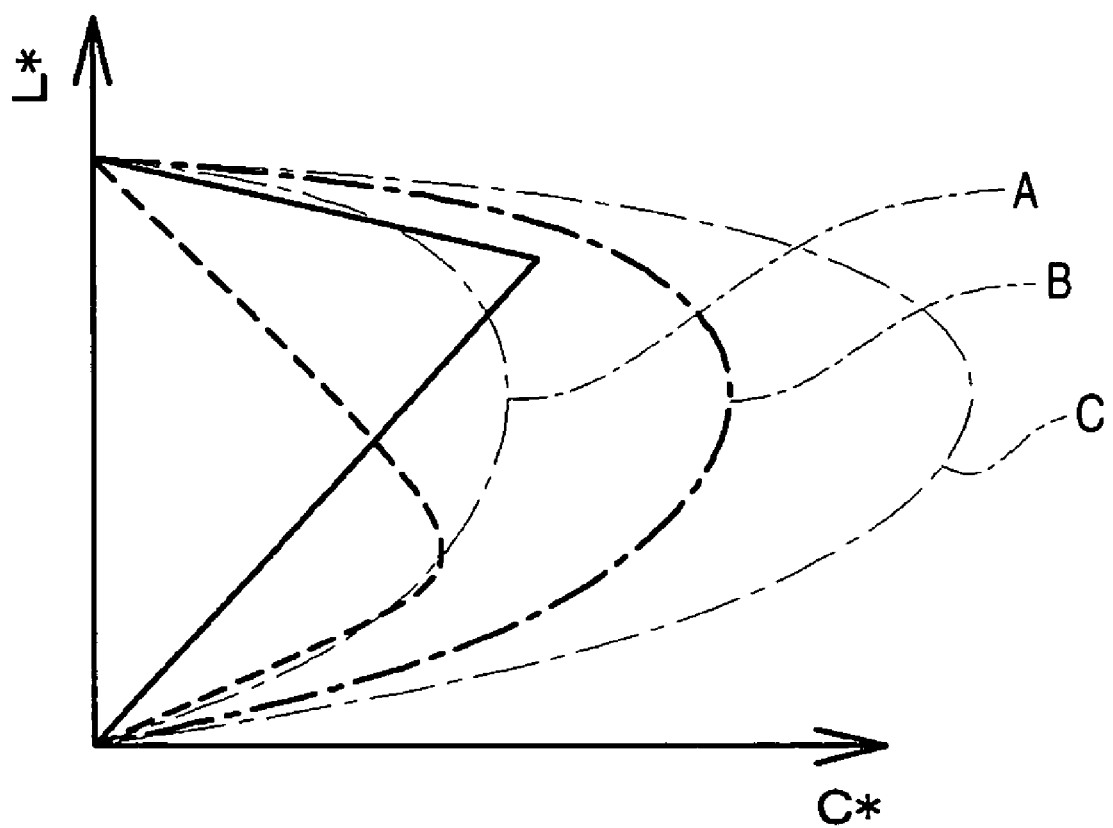
FIG. 14 is a diagram for explaining how to determine a gamut for mapping.

In FIG. 14, the gamut shown by a solid line is the input side gamut (gamut of a display), and the gamut shown by a dashed line is the output side gamut (gamut of a printer). In addition, three gamuts shown by chain lines are gamuts prepared in advance as candidates of a gamut for mapping. When selecting the gamut for mapping, a gamut A, whose gamut is the narrowest, is first selected, and it is judged whether or not the gamut A includes the input side gamut and the output side gamut. Such a judgment can be easily executed by comparing the hues $C^*$ at the respective luminosities $L^*$. That is, where it is assumed that the maximum hue value of the input side gamut at a specified lightness $L^*$ is $C^*in$, the maximum hue value of the output side gamut is $C^*out$, and the maximum hue value of the candidate gamut A is $C^*cndA$, it is judged whether or not $C^*cndA > C^*in$ and $C^*cndA > C^*out$ is established at all the luminosities $L^*$.

In the example shown in FIG. 14, the maximum hue value that can be reproduced by the candidate gamut A is not necessarily greater at all the luminosities $L^*$ than the maximum hue value that can be reproduced by the input side gamut (gamut of the display) or the output side gamut (gamut of the printer). Therefore, in such a case, a gamut B that is greater by one step than the candidate gamut A is selected, and it is judged in the same manner whether or not the gamut B includes the input side gamut and the output side gamut. And, where it has been judged that the candidate gamut B does not include two gamuts at the input side and the output side, a gamut that is still greater by one step is selected, similar judgment may be executed. In the example shown in FIG. 14, since the candidate gamut B includes the input side gamut (gamut of the display) and the output side gamut (gamut of the printer), the gamut B is established as the gamut for mapping.

In Step S208 of FIG. 12, thus, a gamut including the input side gamut and the output side gamut is selected among a plurality of candidate gamuts prepared in advance, and a process for setting the same as a gamut for mapping is executed. When doing so, by a simple processing that selects a gamut satisfying requirements from a plurality of gamuts, it is possible to establish a gamut for mapping. In addition, since judgment on whether or not the requirements are satisfied is executed in order from a smaller color area among a plurality of candidate gamuts prepared, there is no case where an unnecessarily large gamut is selected as the gamut for mapping.

Also, the reason why a gamut for mapping is established by such a simple processing is that any gamut can be used as a gamut for mapping only if the gamut includes two gamuts at the input side and the output side. Indeed, it is not favorable that a mapping gamut becomes complicated in shape. For example, as depicted in FIG. 14, it is favorable that the mapping gamut has a simple shape in which the maximum value of the hue $C^*$ which can be reproduced is monotonously increased in line with a change in the lightness $L^*$ and it is then monotonously decreased.

After the mapping gamut is established as described above, as shown in FIGS. 15A to 15C, the input side gamut is extended to the mapping gamut, and the extended gamut is then compressed to the output side gamut (Steps S210 and 212 in FIG. 12).

Figure 15A:
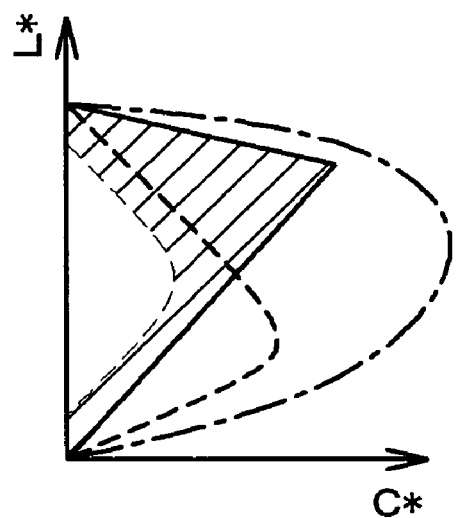
FIGS. 15A to 15C are diagrams for explaining how the gamut is extended and compressed.
Figure 15B:
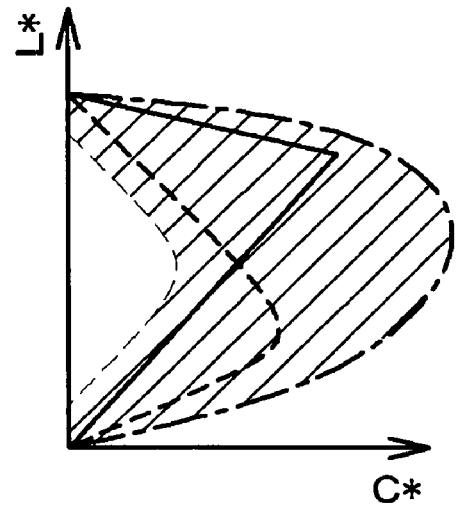
Figure 15C:
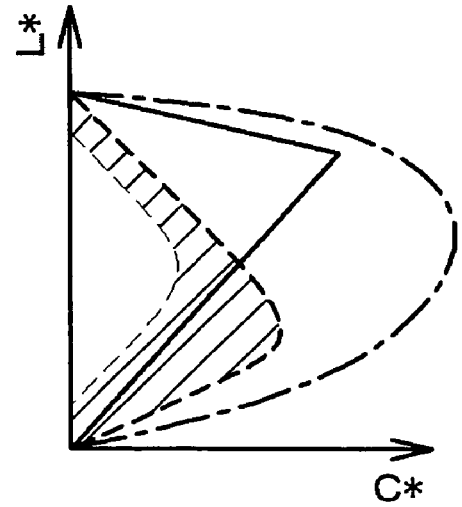

Such a situation occurs, in which colors reproduced in the input side gamut are reproduced as different colors at the output side in line with conversion of the input side gamut to the output side gamut. As a matter of course, it is not favorable that reproduction of the same color image at the input side differs from that at the output side. Therefore, in portions where the same color can be reproduced even in the input side gamut and the output side gamut (that is, portion where two gamuts overlap each other), it is favorable that the input side gamut is converted to the output side gamut so that the color is not changed as much as possible before and after the conversion. With this point of view, when extending the gamut and compressing the same, extension and compression of the gamut are executed except a central portion of the area where the gamuts overlap, so that the original color is maintained at the central portion. That is, when extending the input side gamut to the mapping gamut, mapping is executed so that only a hatched area in FIG. 15A is extended to a hatched area in FIG. 15B. In addition, when compressing the mapping gamut to the output side gamut, mapping is executed so that only a hatched area in FIG. 15B is compressed to a hatched area in FIG. 15C.

In these drawings, although an area where colors are converted to different colors (the hatched area) and an area in which the original colors are maintained (the non-hatched area) are displayed so that these areas clearly classified, there is actually no clear boundary between them so that these two areas consecutively change from one area to the other area. The reason why the boundaries of these areas are shown with dashed lines in the drawings expresses the above-described situation. In Step S210 and S212 in FIG. 12, after the input side gamut is thus extended to the mapping gamut once, the mapping gamut is compressed to the output side gamut.

Figure 16:
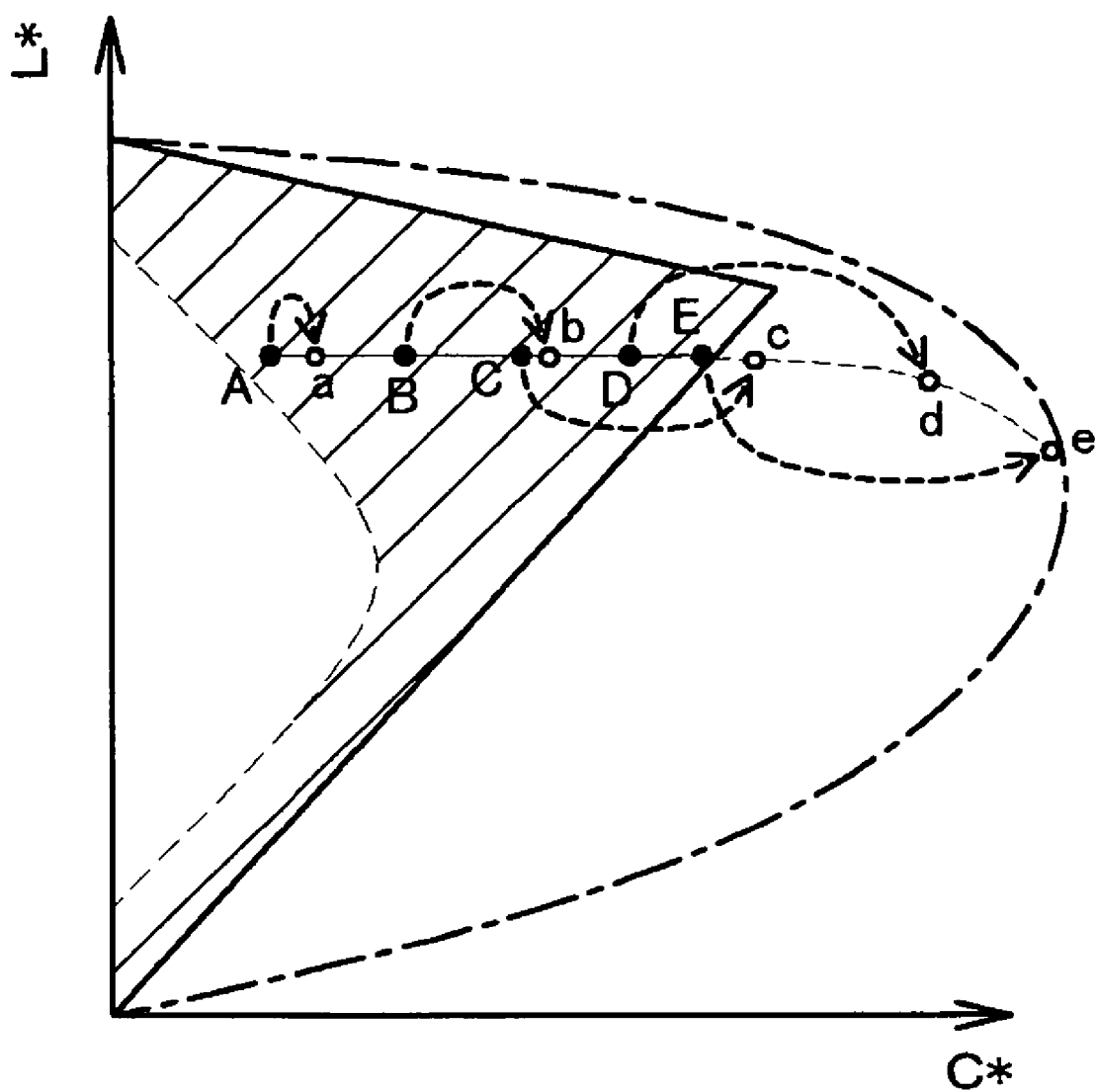
FIG. 16 is a diagram showing how different colors are converted from an input side gamut to the gamut for mapping.

Herein, a description is given of the reason why the input side gamut is once converted to the output side gamut via the mapping gamut. In FIG. 16, it is shown a state where five colors (color A through color E) having equivalent lightness $L^*$ in the input side gamut are converted to five colors (color a through color e) in the mapping gamut. In the example shown in the drawing, the colors A through color E in the input side gamut are converted to color a through color e whose color saturation $C^*$ is intensified, and the degree of intensification is gradually increased to an increase in the color saturation $C^*$ of the original colors. Further, for the colors (for example, color D and color E) having intensive color saturation, the luminosities $L^*$ thereof are changed. As described above, since the mapping gamut is established so as to include the input side gamut, only conversion is generated in the direction of thus intensifying the color saturation $C^*$ when converting the input side gamut to the mapping gamut. Accordingly, conversion of extending a gamut with the continuity of color and lightness maintained can be easily achieved.

Figure 17:
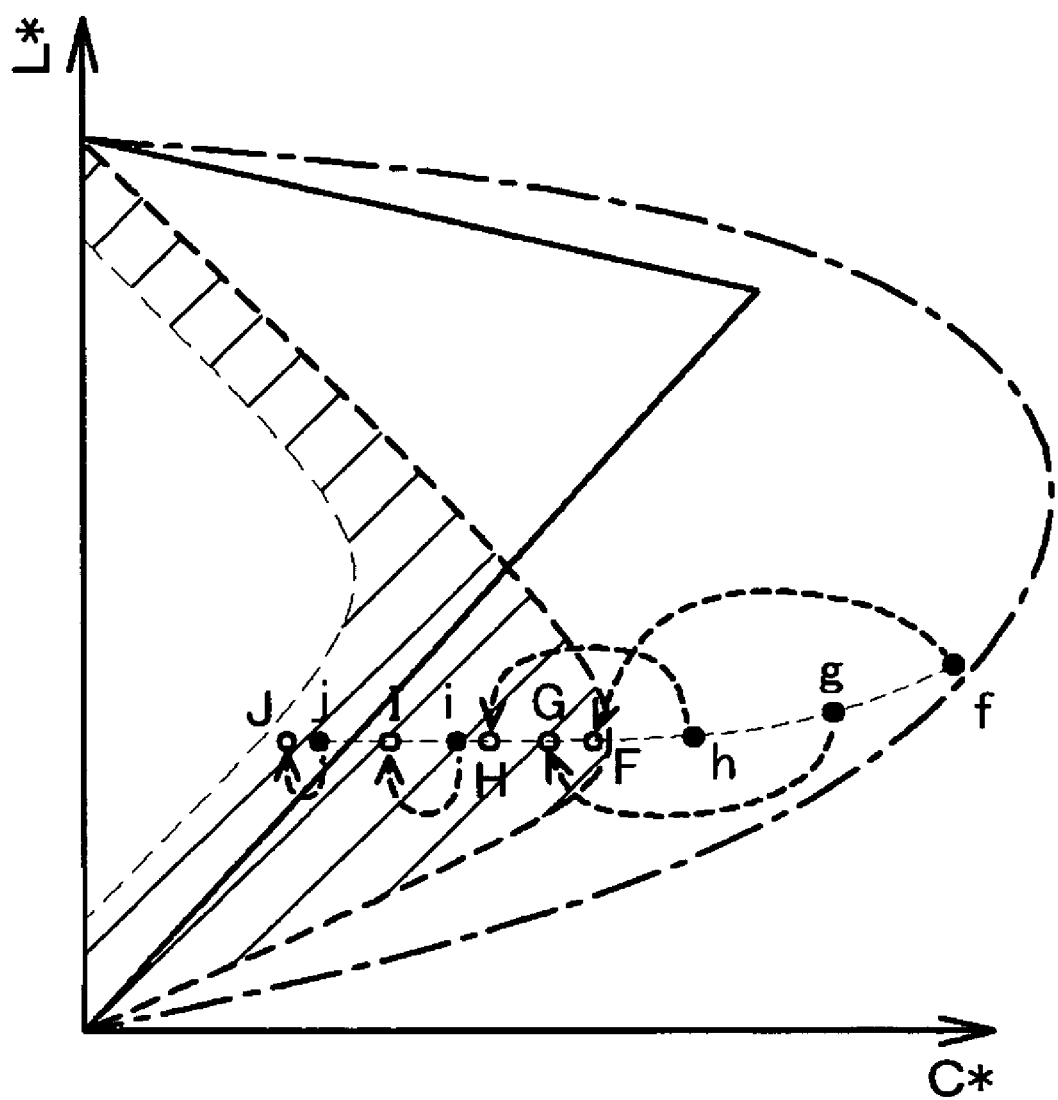
FIG. 17 is a diagram showing how different colors are converted from the gamut for mapping to an output side gamut.

FIG. 17 shows a state where five colors (color f through color j) in the mapping gamut are converted to five colors (color F through color J) which are in the output side gamut and has equivalent lightness $L^*$. In the example shown in the drawing, the color f through color j in the mapping gamut are color F through color J whose color saturation $C^*$ is compressed. In addition, the degree of compression is increased in line with an increase in color saturation $C^*$ of the original color, and further, the lightness $L^*$ is also changed in regard to the colors (for example, color f and color g) having high color saturation. As described above, since the mapping gamut is established so as to include the output side gamut, only conversion in the direction of thus compressing the color saturation $C^*$ is generated when converting the mapping gamut to the output side gamut. Therefore, it is possible to easily achieve conversion for compressing the gamut with the continuity of colors and lightness maintained.

If the input side gamut is directly converted to the output side gamut without using the mapping gamut, such simple conversion as shown in FIGS. 16 and 17 cannot be brought about. That is, conversion of compressing the color saturation $C^*$ is executed in an area where the lightness $L^*$ takes a large value, and conversion of intensifying the color saturation $C^*$ is executed in an area where the lightness $L^*$ takes a small value. Further, as shown in FIGS. 16 and 17, since the lightness $L^*$ is changed in a high color saturation area when extending and compressing the gamut, respectively, an area in which the color saturation $C^*$ is intensified in line with conversion and an area in which the color saturation $C^*$ is compressed in line therewith are generated in a mixed state in an area having intermediate lightness $L^*$. As a result, if it is attempted that similar conversion is achieved by directly converting the input side gamut to the output side gamut without using the mapping gamut, complicated mapping must be required, in which the directions and distances of mapping individual colors are complicatedly changed over. In fact, it is difficult to execute such complicated mapping. Therefore, it is difficult to convert gamuts with continuity of colors and lightness maintained.

When the input side gamut is converted to the output side gamut by the mapping gamut as described above (Steps S210 and S212 in FIG. 12), it is judged whether or not the above-described processing is completed for all the basic hues (Step S214). Herein, the hues are six hues of Y, R, M, B, C and G shown in FIG. 13A. As described above, in Step S202, one hue is selected from these six basic hues, and the above-described processing is executed for the selected hue. When there remains any hue for which the above processing is not completed (Step S214: No), the flow is returned to Step S202, wherein a basic hue is newly selected, and a series of the above-described processing are repetitively executed. When the processing is completed for all the basic hues (Step S214: Yes), processing for generating mapping data is executed by an interpolation calculation (Step S216).

Figure 18:
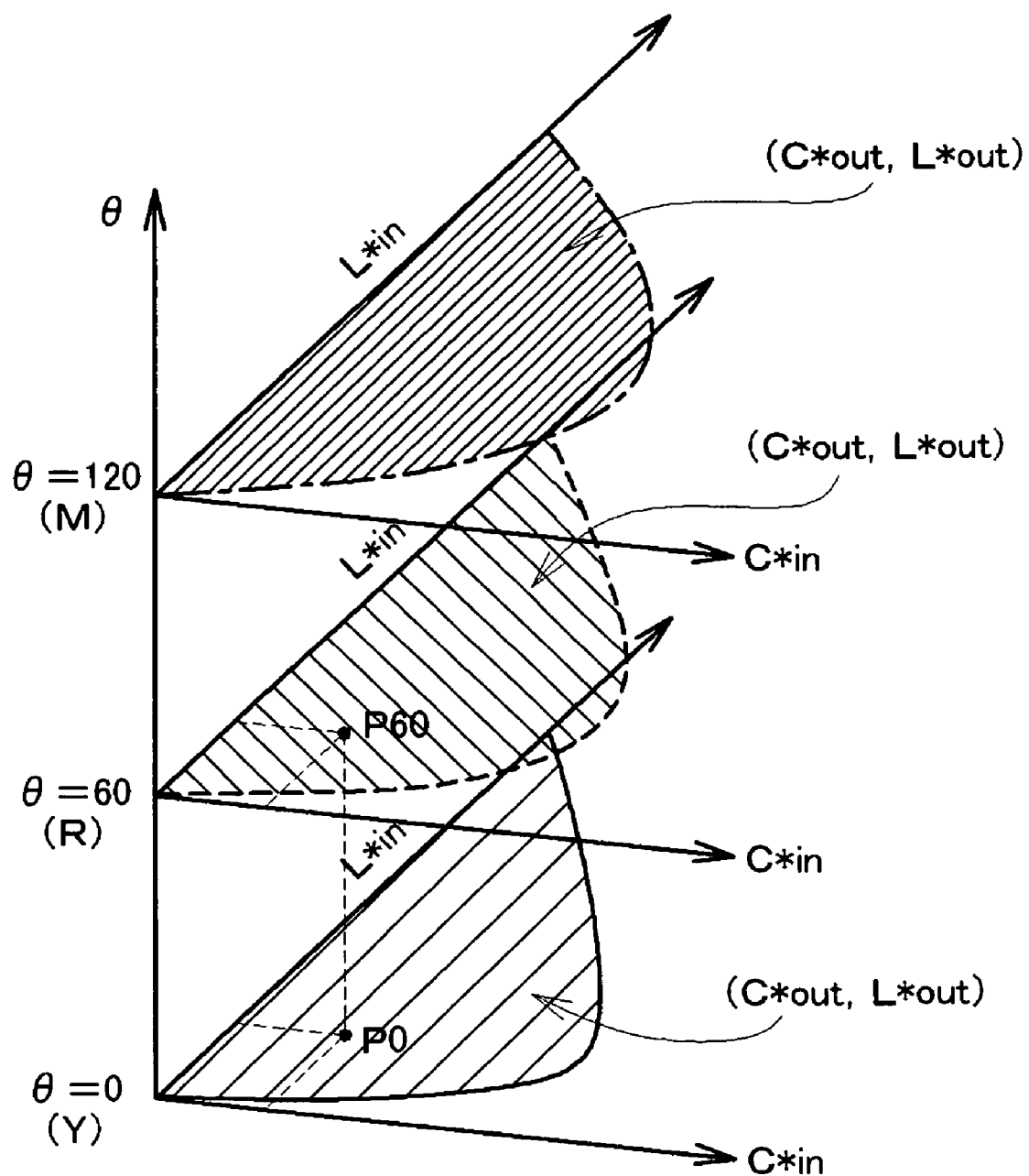
FIG. 18 is a diagram showing how to interpolate mapping data obtained for basic hues.

The input side gamut having been converted to the output side gamut at a specified hue means that the output side colors (C*out, L*out) are caused to correspond to the coordinate values (C*in, L*in) of the input side on the plane of the color saturation C*-Lightness L* of the hue. FIG. 18 collectively shows the matching relationship between such (C*in, L*in) and (C*out, L*out), which are obtained for the basic hues. In addition, the axis of ordinates shown in the drawing represents an angle θ corresponding to the hue in the columnar coordinates explained with reference to FIG. 13A. Although six basic hues actually exist, the hue B corresponding to θ=180, the hue C corresponding to θ=240, and the hue G corresponding to θ=300 are omitted here.

When a matching relationship between (C*in, L*in) and (C*out, L*out) at a specified hue (for example, θ=30) is required, the color saturation C* and lightness L* at a hue for θ=30 may be calculated by an interpolation calculation based on colors established for the basic hues at both side thereof, that is, a color established at a point 0 located on a plane of hue Y for θ=0, and a color established at a point 60 located on a plane of hue R for θ=60. In Step S216 of FIG. 12, processing for generating mapping data for all the hues is executed by executing an interpolation calculation for every fixed angle (for example, every 10 degrees) based on the matching relationship between the input side gamut and the output side gamut, which are obtained for the six basic hues.

As described above, after mapping data for all the hues are obtained, the mapping data generation processing shown in FIG. 12 is terminated. The process is returned to the look-up table preparation processing in FIG. 11, and it is executed processing for setting CMYK image data at lattice points of the look-up table based on the thus obtained mapping data.

Figure 19:
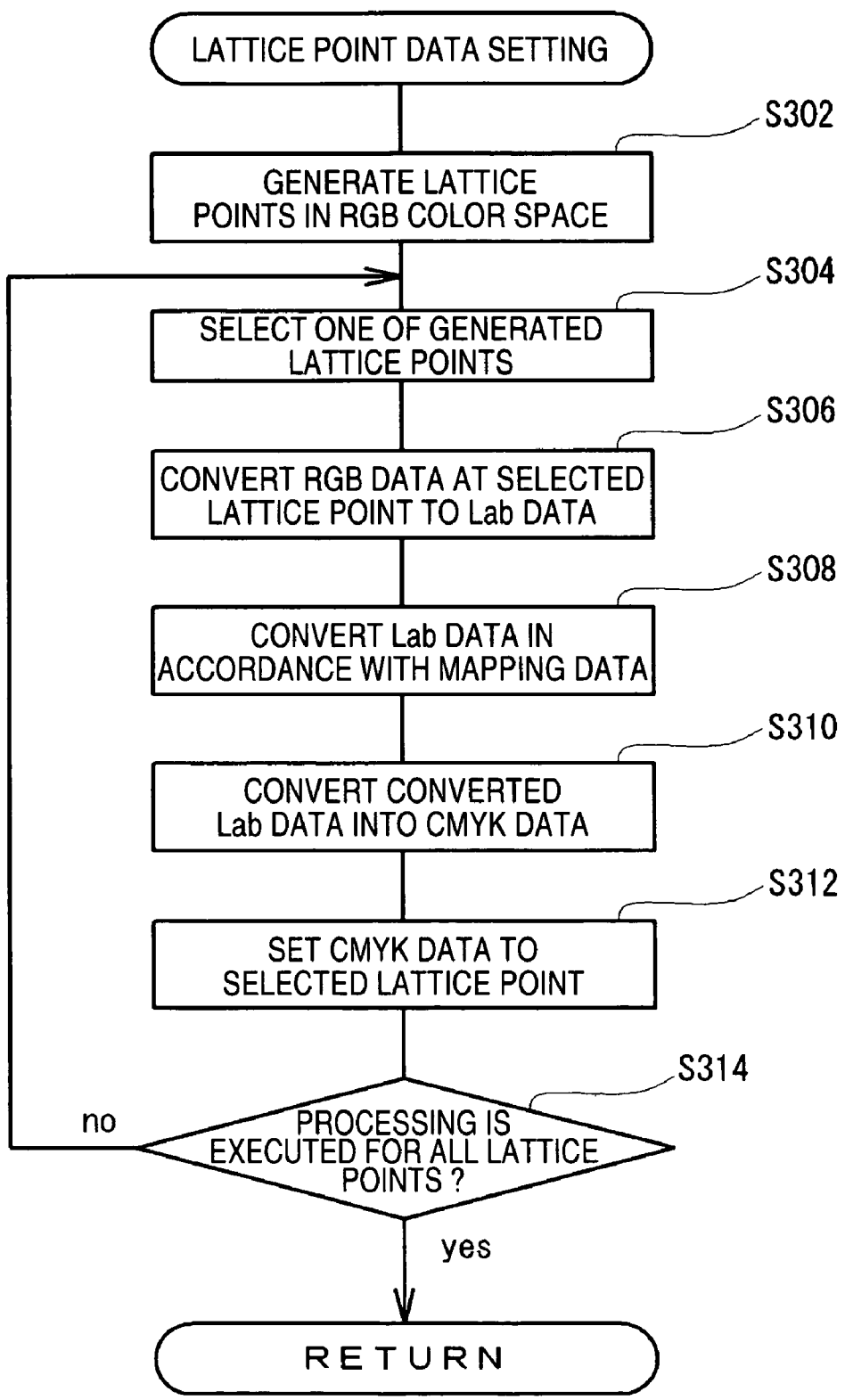
FIG. 19 is a flowchart showing processing for setting CMYK data as lattice point data, which is executed in the printer.
Figure 20:
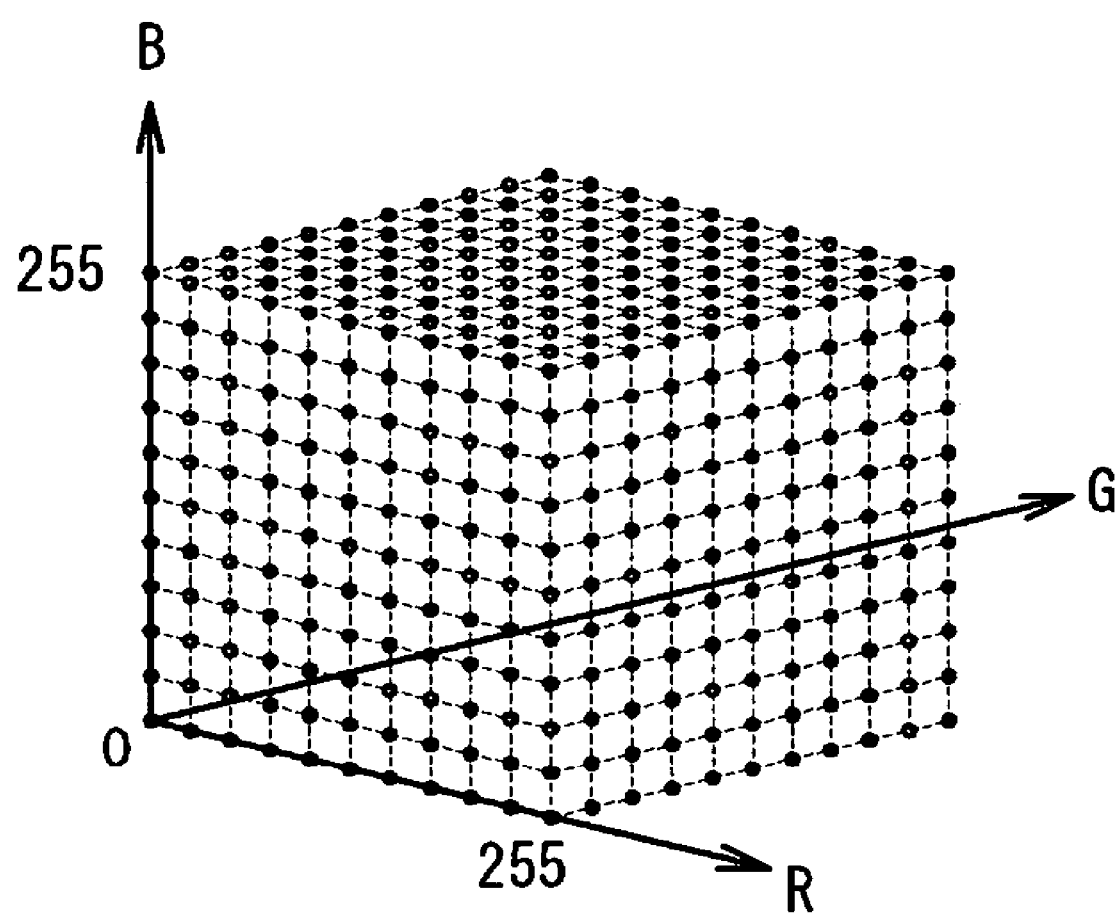
FIG. 20 is a diagram showing a state that a plurality of lattice points are generated in a color space of RGB.

As shown in FIG. 19, first, a plurality of lattice points are generated by subdividing space of RGBs in the form of a lattice (Step S302). When the image data are composed of 1 byte data, the RGB image data are image data which can take a gradation value 0 through a gradation value 255, for respective components of R, G and B. Therefore, where it is assumed that space of RGBs whose one side length is 255, with R coordinate, G coordinate and B coordinate taken as three axes orthogonal to each other, it is possible that all the RGB image data are caused to correspond to a color space of RGB of this cube, as shown in FIG. 20. In Step S302, a process is executed, which the respective axes are divided at a right angle, and a plurality of lattice points are generated in the color space of RGB.

Next, one lattice point for which lattice point data (CMYK image data) are to be set is selected from a plurality of lattice points generated in the color space of RGB (Step S304). The lattice point is set in the color space of RGB, and the coordinate values of the lattice point represent the RGB image data. Herein, the RGB image data are understood as color image data expressed on the basis of the so called standard "sRGB", and the RGB image data are converted to color data (Lab data) expressed by the Lab color coordinate system (Step S306). When the RGB image data are expressed by the sRGB standard, it is possible to convert the same to the Lab data indicative of the same colors by a simple conversion reproduction.

After the Lab data corresponding to the thus selected lattice point, the Lab data are converted in compliance with the mapping data obtained by the above-described mapping data generation processing (Step S308). That is, as described above, the obtained mapping data are data indicating that what colors the RGB image data may be converted in order to adequately reproduce the RGB image data used in a digital camera and a display by the CMYK image data having a different gamut. Therefore, if the mapping data are used for reference, it is possible to know as to what colors in the CMYK image data the colors reproduced by the coordinate values of the lattice points are to be reproduced. As described above, the mapping data are expressed by the columnar coordinates in which a hue is expressed by an angle θ and the color saturation is expressed by the distance from the center axis with the lightness L* used as the center axis. On the other hand, although the Lab data are expressed by orthogonal coordinates in which hue and color saturation are expressed by a* axis an b* axis orthogonal to each other with the lightness L* taken as an axis of ordinate, the coordinate system of the mapping data may be converted from the columnar coordinate to the orthogonal coordinate. Thus, the Lab data converted on the basis of the mapping data show to what colors the colors expressed by the coordinate values of the lattice point are converted in order to adequately absorb differences in gamuts between the RGB image data and the CMYK image data where the colors expressed by the coordinate values of the lattice point are expressed by the CMYK image data.

Therefore, the Lab data thus obtained are converted to the CMYK image data (Step S310). Such a conversion is executed based on matching relationships between various types of CMYK image data and the Lab colorimetric value actually obtained based on the image data. Such matching relationship may be obtained by printing a color image called a patch image as described below.

Figure 21:
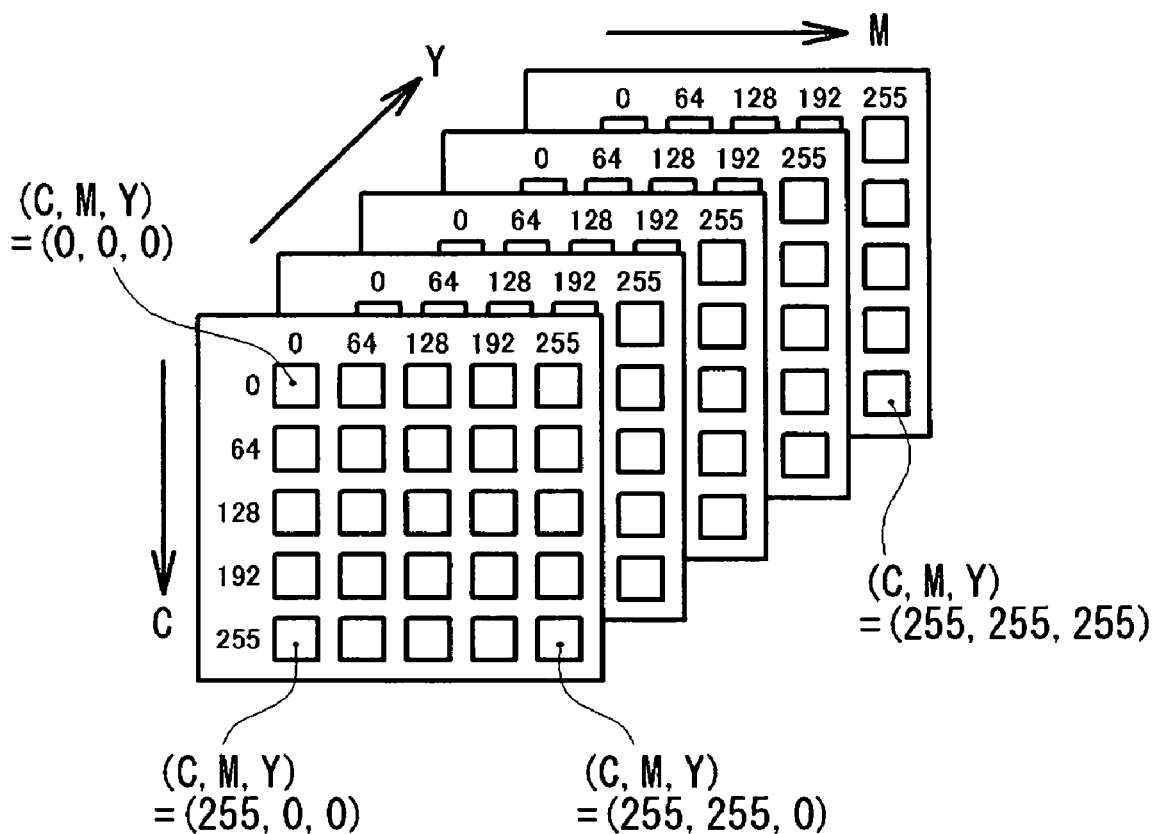
FIG. 21 is a diagram showing a state that patch images are printed through the use of the CMYK data.

In FIG. 21, each of small rectangles represents a color image (patch image) corresponding to a unique CMYK image data. An actual patch image is printed while so-called four-dimensionally changing four types of gradation values of C, M, Y and K in a range from 0 through 255. However, it is difficult that such four-dimensional changes are depicted as a two-dimensional figure. Therefore, in FIG. 21, for convenience, three types of gradation values of C, M and Y are reproduced as being so-called three-dimensionally changing. When the colors of the patch image thus printed are measured, it is possible to obtain matching relationship between the CMYK image data and the Lab data. In Step S310 in FIG. 19, by referencing to the matching relationship that has been thus obtained, the Lab data are converted to the CMYK image data corresponding thereto.

As described above, after the CMYK image data for the selected lattice points are obtained, the obtained CMYK image data are set to the lattice points as lattice point data (Step S312). Next, it is judged whether or not the lattice point data are stored in regard to all the lattice points generated in the color space of RGB (Step S314). And, if there remains any lattice point for which the lattice point data are not set (Step S314: No), the process is returned to Step S304, wherein one lattice point is selected, and the above-described processing is executed for the newly-selected lattice point. After repeating such processing, when it is judged that the lattice point data are set for all the lattice points (Step S314: Yes), this processing is terminated. After being returned to the look-up table preparation processing of FIG. 11, the look-up table preparation processing is also terminated. As a result, it is possible to obtain look-up tables in which CMYK image data are established for all the lattice points.

The look-up table thus obtained not only converts color image data reproduced by the gradation values of respective colors of RGB to data reproduced by the gradation values of respective colors of CMYK but also adequately absorbs differences in gamuts between the RGB image data and the CMYK image data. In the printer 10 according to the embodiment, since a color conversion is executed by referencing such a look-up table (Step S104 in FIG. 7), it is possible to print high-quality color images.

In the first embodiment, when setting a mapping gamut, it is selected a gamut including the input side gamut and the output side gamut from a plurality of candidate gamuts prepared in advance. However, it may be possible to generate a mapping gamut based on the profiles of the input side gamut and the output side gamut, as a second embodiment of the invention.

Figure 22:
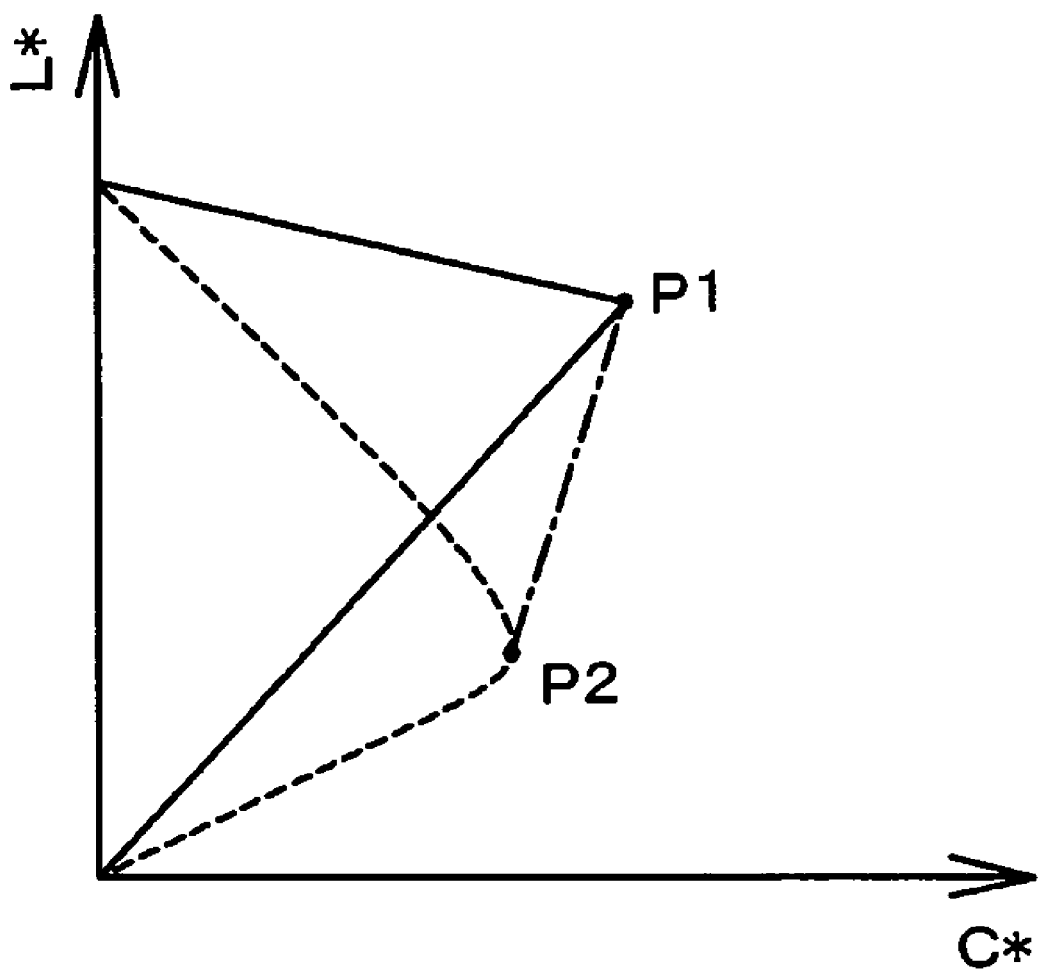
FIG. 22 is a diagram for explaining how to determine a gamut for mapping, according to a second embodiment of the invention.
Figure 23A:
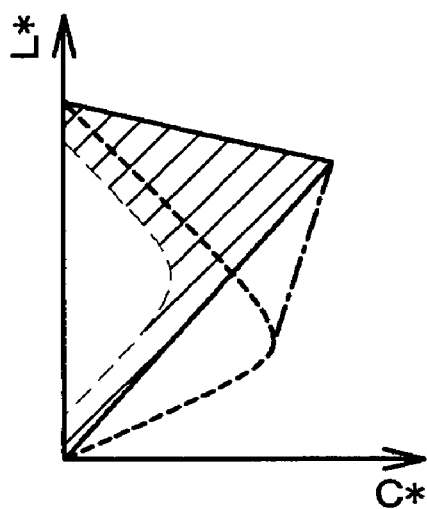
FIGS. 23A to 23C are diagrams for explaining how the gamut is extended and compressed in a case where the mapping gamut shown in FIG. 22 is used.
Figure 23B:
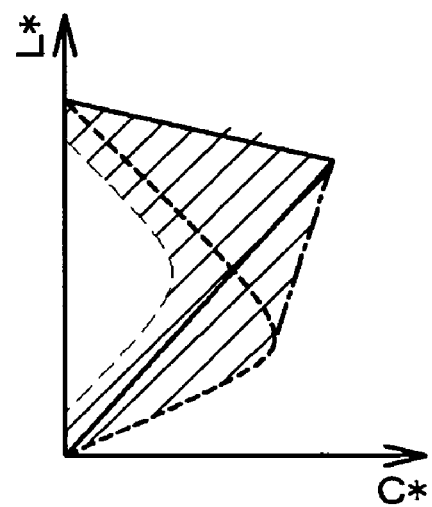
Figure 23C:
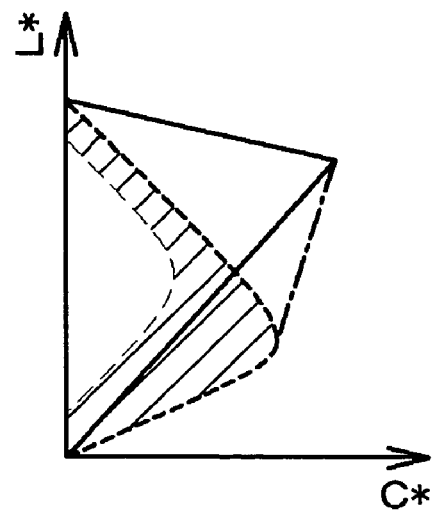

As shown in FIG. 22, a mapping gamut is generated by connecting the maximum color saturation point P1 of the input side gamut (gamut of a display) with the maximum color saturation point P2 of the output side gamut (gamut of a printer). FIGS. 23A to 23C show a state that the input side gamut is extended to the generated mapping gamut, and the mapping gamut is then compressed to the output side gamut. Even in a case where the input side gamut is converted to the output side gamut by way of the thus generated mapping gamut, there is no case where extension and compression of the color saturation C* are executed at the same time. For this reason, it is possible to convert the input side gamut to the output side gamut with continuity of color and lightness maintained.

In the above embodiments, the conversion (mapping) is executed to absorb differences in gamuts between the RGB image data and the CMYK image data. However, it is known that the gamuts differ from each other in devices handling the same RGB image data. In such cases, mapping is required to absorb differences in gamuts between RGB image data. Therefore, the embodiment may be applicable to cases where specified RGB image data are converted to another RGB image data and where specified CMYK image data are converted to another CMYK image data.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of generating mapping data for converting first image data adapted to be reproduced by a first imaging device having a first gamut to second image data adapted to be reproduced by a second imaging device having a second gamut which is different from the first gamut, the method comprising:
   determining a third gamut so as to include the first gamut and the second gamut;
   extending the first gamut to the third gamut to obtain first mapping relationships;
   compressing the third gamut to obtain second mapping relationships; and
   generating the mapping data associating first colors included in the first gamut with second colors included in the second gamut by way of the first mapping relationships and the second mapping relationships,
   wherein the extending and the compressing are performed except for a portion of an overlap of the first gamut and the second gamut, the overlap of the first gamut and the second gamut including colors which can be reproduced in both the first gamut and the second gamut.

2. The method as set forth in claim 1, wherein:
   the third gamut is determined by connecting a first point at which a color saturation becomes maximum in the first gamut and a second point at which the color saturation becomes maximum in the second gamut.

3. The method as set forth in claim 1, further comprising:
   a) preparing a plurality of gamuts in advance;
   b) selecting a smaller one of the gamuts;
   c) comparing the smaller one of the gamuts with the first gamut and the second gamut;
   d) determining the smaller one of the gamuts as the third gamut when the smaller one of the gamuts includes the first gamut and the second gamut;
   e) selecting a larger one of the gamuts when the smaller one of the gamuts does not include any one of the first gamut and the second gamut; and
   f) repeating the steps b) through e) until selected one of the gamuts includes the first gamut and the second gamut.

* * * * *